United States Patent
Peng et al.

(10) Patent No.: US 8,920,771 B2
(45) Date of Patent: Dec. 30, 2014

(54) WATER PURIFICATION USING ENERGY FROM A STEAM-HYDROCARBON REFORMING PROCESS

(71) Applicant: Air Products and Chemicals Inc., Allentown, PA (US)

(72) Inventors: Xiang-Dong Peng, Orefield, PA (US); Bryan Clair Hoke, Jr., Bethlehem, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 14/061,157

(22) Filed: Oct. 23, 2013

(65) Prior Publication Data

US 2014/0034479 A1    Feb. 6, 2014

Related U.S. Application Data

(63) Continuation-in-part of application No. 13/858,363, filed on Apr. 8, 2013, now Pat. No. 8,709,287.

(60) Provisional application No. 61/648,662, filed on May 18, 2012.

(51) Int. Cl.
  *C01B 3/24* (2006.01)
  *C02F 1/06* (2006.01)
  *B01D 3/14* (2006.01)
  *C01B 3/38* (2006.01)

(52) U.S. Cl.
  CPC ......... *B01D 3/146* (2013.01); *C01B 2203/0827* (2013.01); *C02F 1/06* (2013.01); *C01B 2203/043* (2013.01); *C01B 2203/0283* (2013.01); *C01B 2203/0816* (2013.01); *C01B 2203/0233* (2013.01); *C01B 2203/0495* (2013.01); *C01B 2203/0883* (2013.01); *C01B 3/384* (2013.01)
  USPC .......................................... 423/650; 203/22

(58) Field of Classification Search
  USPC ........................................................ 423/650
  See application file for complete search history.

(56) References Cited

U.S. PATENT DOCUMENTS

| | | | |
|---|---|---|---|
| 3,399,118 A | 3/1964 | Williamson |
| 3,412,558 A | 11/1968 | Starmer |
| 3,441,393 A | 4/1969 | Finneran et al. |
| 3,479,820 A | 11/1969 | Rutenberg |
| 3,597,328 A | 8/1971 | Michels |
| 3,691,020 A | 9/1972 | Hughes |
| 3,875,017 A | 4/1975 | Saari et al. |
| 4,338,199 A | 7/1982 | Modell |
| 5,421,962 A | 6/1995 | Shvarts et al. |
| 5,441,548 A | 8/1995 | Brandl et al. |
| 7,037,485 B1 | 5/2006 | Dmevich et al. |
| 7,377,951 B2 | 5/2008 | Pham et al. |

(Continued)

FOREIGN PATENT DOCUMENTS

| | | |
|---|---|---|
| CA | 2190299 | 11/1996 |
| DE | 102 16 709 B4 | 4/2003 |

(Continued)

*Primary Examiner* — Melvin C Mayes
*Assistant Examiner* — Kenneth Vaden
(74) *Attorney, Agent, or Firm* — Bryan C. Hoke, Jr.

(57) ABSTRACT

A process and system for producing a $H_2$-containing product gas and purified water from an integrated catalytic steam-hydrocarbon reforming and thermal water purification process. Raw water, such as salt water, is heated by indirect heat transfer with reformate from the catalytic steam reforming process for purifying raw water in one of a multiple effect distillation process and a multi-stage flash process.

14 Claims, 9 Drawing Sheets

(56) References Cited

U.S. PATENT DOCUMENTS

| | | |
|---|---|---|
| 7,427,368 B2 | 9/2008 | Drnevich |
| 7,988,948 B2 | 8/2011 | Guvelioglu |
| 8,387,545 B2 | 3/2013 | Latimer et al. |
| 8,430,947 B2 | 4/2013 | Latimer et al. |
| 8,496,908 B1 | 7/2013 | Genkin et al. |
| 2004/0038089 A1 | 2/2004 | Hoffjann et al. |
| 2007/0246345 A1 | 10/2007 | Leveson et al. |
| 2009/0117024 A1 | 5/2009 | Weedon et al. |
| 2009/0230359 A1 | 9/2009 | Guvelioglu et al. |
| 2011/0147195 A1 | 6/2011 | Shapiro et al. |
| 2011/0162952 A1 | 7/2011 | Conchieri et al. |
| 2012/0055776 A1 | 3/2012 | Feher |

FOREIGN PATENT DOCUMENTS

| | | |
|---|---|---|
| EP | 0142214 | 5/1985 |
| EP | 0200825 A1 | 12/1986 |
| EP | 1921281 | 10/2007 |
| GB | 754745 | 8/1956 |
| GB | 2443802 | 5/2008 |
| GB | 2470874 A | 12/2010 |
| WO | 2004103896 | 12/2004 |
| WO | 2007149879 A2 | 12/2007 |

WATER PURIFICATION USING ENERGY FROM A STEAM-HYDROCARBON REFORMING PROCESS

CROSS-REFERENCE TO RELATED APPLICATIONS

This patent application is a continuation in part of U.S. patent application Ser. No. 13/858,363, filed Apr. 8, 2013, now U.S. Pat. No. 8,709,287 which claims the benefit of Provisional Application Ser. No. 61/648,662, filed on May 18, 2012, the contents of each of which are hereby incorporated by reference as if fully set forth.

BACKGROUND

Thermal water purification processes, such as thermal desalination of salt water using multi-stage flash (MSF) or multiple effect distillation (MED), use heat from a low-pressure, high-quality steam energy source to effect the water purification process. Low pressure steam is generated using common boiler technology (cf. U.S. Pat. Nos. 4,338,199 and 5,441,548).

It is known to use other forms of energy for desalination. For example, U.S. Pat. No. 5,421,962 utilizes solar energy for desalination processes, U.S. Pat. Pub. 2011/0162952 utilizes energy from a gasification process, and U.S. Pat. Pub. 2011/0147195 uses waste heat from a power generation plant for the desalination process.

Industry desires to utilize waste heat from catalytic steam-hydrocarbon reforming processes. Catalytic steam-hydrocarbon reforming processes release a large amount of waste heat under various circumstances. One circumstance is when the energy cost is low and less capital is spent on heat recovery. Another circumstance is when the process does not produce a large amount of high pressure export steam due to the lack of demand for export steam. Low or zero export steam production reduces the heat sink for the process, resulting in a large amount of waste heat.

Industry desires to produce purified water in water-stressed regions. The water can be used as make-up water in the catalytic steam-hydrocarbon reforming process, making the process self-sufficient with regard to water. Water can also be sold as a product for industrial and municipal use.

Industry desires to reduce or eliminate water treatment cost in a catalytic steam-hydrocarbon reforming plant. Currently, make-up water needs to be treated in a catalytic steam-hydrocarbon reforming plant so that it meets the requirements for the boiler feed water. These treatments include filtration to remove particulates, demineralization to remove dissolved minerals, and deaeration to remove soluble gases such as $O_2$ and $CO_2$.

Industry desires to reduce the capital and energy cost of the catalytic steam-hydrocarbon reforming process. The thermal efficiency of catalytic steam-hydrocarbon reforming processes depends on the utilization of low level heat. When the energy cost is high, more low level heat is recovered for better thermal efficiency or lower energy cost. However, recovering more heat means using more and/or larger heat exchangers, resulting in higher capital cost. In contrast, when the energy cost is low, the capital cost for heat exchangers is minimized with the sacrifice of thermal efficiency or energy cost.

There exists a need in the art for systems and processes for producing $H_2$-containing product gas and purified water that are cost-effective and provide greater heat utilization of waste heat from catalytic steam-hydrocarbon reforming processes.

BRIEF SUMMARY

Embodiments of the present invention satisfy the need in the art by providing systems and processes for producing a $H_2$-containing product gas and purified water from an integrated catalytic steam-hydrocarbon reforming and thermal water purification process. Embodiments of the present invention better utilize waste heat from catalytic steam-hydrocarbon reforming by using heat from the reformate in each effect or stage of the thermal water purification process. Embodiments of the present invention can reduce or eliminate costs associated with dissipating excess waste heat and can also provide flexibility to balance heat load and other operating conditions across the thermal water purification process.

There are several specific aspects of the systems and processes outlined below. The reference numbers and expressions set in parentheses are referring to an example embodiment explained further below with reference to the figures. The reference numbers and expressions are, however, only illustrative and for the convenience of the reader, and do not limit the aspect to any specific component or feature of the example embodiment. The aspects can be formulated as claims in which the reference numbers and expressions set in parentheses are omitted or replaced by others as appropriate.

Aspect 1. A process for producing a $H_2$-containing product gas (200) and for producing purified water (42) from a raw water stream (53) containing contaminants, the process comprising:

(i) withdrawing a reformate (60) comprising $H_2$, CO, $CH_4$, and $H_2O$ from a reformer furnace (100);

(ii) passing at least a portion (62) of the reformate (60) from step (i) to a first evaporator (58) of a plurality of evaporators of a thermal water purification system (16);

(iii) passing at least a portion (63) of the raw water stream (53) to the first evaporator (58);

(iv) introducing a first steam stream (41) into the first evaporator (58), the first steam stream (41) formed in a second evaporator (52) of the plurality of evaporators of the thermal water purification system (16);

(v) heating the at least a portion (63) of the raw water stream (53) passed to the first evaporator (58) in step (iii) in the first evaporator (58) by indirect heat transfer with the at least a portion (62) of the reformate (60) from step (ii) and separately by indirect heat transfer with the first steam stream (41) from step (iv) to form a second steam stream (43) by evaporating a portion of the at least a portion (63) of the raw water stream (53), thereby cooling the at least a portion (62) of the reformate (60), forming a first condensate stream (71) from the first steam stream (41), and concentrating the contaminants in the at least a portion (63) of the raw water stream (53);

(vi) withdrawing the second steam stream (43) from the first evaporator (58);

(vii) withdrawing the at least a portion (62) of the reformate (60) from the first evaporator (58);

(viii) withdrawing the first condensate stream (71) from the first evaporator (58), wherein the purified water (42) comprises the first condensate stream (71);

(ix) withdrawing the at least a portion (63) of the raw water stream (53) from the first evaporator (58), the at least a portion (63) of the raw water stream (53) having a higher concentration of the contaminants than when it was introduced into the first evaporator (58); and (x) passing the at least a portion (62) of the reformate (60) withdrawn in step (vii) to a gas separator (210) and separating the at least a portion (62) of the reformate (60) in the gas separator (210) to produce at least a portion of the $H_2$-containing product gas stream (200) and at least a portion of a by-product gas stream (250).

The at least a portion (63) of the raw water stream (53) in which the contaminants are concentrated in step (v), and that is withdrawn from the first evaporator (58) in step (ix), is the remainder of the at least a portion (63) of the raw water stream (53) introduced into the first evaporator (58) that is not evaporated in step (v) to form the second steam stream (43).

Aspect 2. The process of Aspect 0, wherein the first steam stream (41) is formed by indirect heat exchange with at least one of (a) a second portion (68) or all of the reformate (60) and (b) a steam stream (46) formed in a third evaporator (83).

Aspect 3. The process of Aspect 1 or Aspect 2, wherein the at least a portion (62) of the reformate (60) is cooled to a temperature ranging from 25° C. to 65° C. in the first evaporator (58).

Aspect 4. The process of any one of Aspects 1 through 3, wherein all of the reformate (60) is passed to the first evaporator (58).

Aspect 5. The process of any one of Aspects 1 through 4, wherein the at least a portion (62) of the reformate (60) in step (ii) is all of the reformate (60).

Aspect 6. The process of any one of Aspects 1 through 5, further comprising passing at least a portion of the purified water (42) as make-up water (95) to a steam-hydrocarbon reforming system comprising the reformer furnace (100).

Aspect 7. The process of any one of Aspects 1 through 6, wherein the reformate (60) or portions thereof heat the raw water stream (53) or portions thereof in each of the plurality of evaporators.

Aspect 8. The process of any one of Aspects 1 through 7, wherein the raw water comprises at least one of salt water, river water, stream water, lake water, municipal recycled water, industrial recycled water, groundwater, and process condensate from a steam methane reforming process.

Aspect 9. The process of any one of Aspects 1 through 8 wherein the gas separator (210) is a pressure swing adsorber and the at least a portion (62) of the reformate (60) is separated by pressure swing adsorption to produce the at least a portion of the $H_2$-containing product gas stream (200) and the at least a portion of a by-product gas stream (250).

Aspect 10. The process of any one of Aspects 1 through 9, wherein the at least a portion (62) or a second portion (68) of the reformate (60) transfers heat to the at least a portion (63) or a second portion (69) of the raw water stream (53) by indirect heat transfer in the second evaporator (52).

Aspect 11. The process of Aspect 10, wherein the at least a portion (62) of the reformate (60) transfers heat to the second portion (69) of the raw water stream (53) by indirect heat transfer in the second evaporator (52) by:

passing the at least a portion (62) of the reformate (60) to the second evaporator (52), passing the second portion (69) of the raw water stream (53) to the second evaporator (52); and heating the second portion (69) of the raw water stream (53) in the second evaporator (52) by indirect heat transfer with the at least a portion (62) of the reformate (60) thereby forming the first steam stream (41) by evaporating a portion of the second portion (69) of the raw water stream (53), thereby cooling the at least a portion (62) of the reformate (60), and concentrating the contaminants in the second portion (69) of the raw water stream (53).

The second portion (69) of the raw water stream (53) in which the contaminants are concentrated is the remainder of the second portion (69) of the raw water stream (53) introduced into the second evaporator (52) that has not been evaporated to form the first steam stream (41).

Aspect 12. The process of Aspect 11, further comprising:

withdrawing the first steam stream (41) from the second evaporator (52);

withdrawing the at least a portion (62) of the reformate (60) from the second evaporator (52); and withdrawing the second portion (69) of the raw water stream (53) from the second evaporator (52), the second portion (69) of the raw water stream (53) having a higher concentration of the contaminants than when it was introduced into the second evaporator (52).

Aspect 13. The process of Aspect 10, wherein the second portion (68) of the reformate (60) transfers heat to the second portion (69) of the raw water stream (53) by indirect heat transfer in the second evaporator (52) by:

passing the second portion (68) of the reformate (60) to the second evaporator (52);

passing the second portion (69) of the raw water stream (53) to the second evaporator (52); and heating the second portion (69) of the raw water stream (53) in the second evaporator (52) by indirect heat transfer with the second portion (68) of the reformate (60) thereby forming the first steam stream (41) by evaporating a portion of the second portion (69) of the raw water stream (53), thereby cooling the second portion (68) of the reformate (60), and concentrating the contaminants in the second portion (69) of the raw water stream (53).

The second portion (69) of the raw water stream (53) in which the contaminants are concentrated is the remainder of the second portion (69) of the raw water stream (53) introduced into the second evaporator (52) that has not been evaporated to form the first steam stream (41).

Aspect 14. The process of Aspect 13, further comprising:

withdrawing the first steam stream (41) from the second evaporator (52);

withdrawing the second portion (68) of the reformate (60) from the second evaporator (52);

withdrawing the second portion (69) of the raw water stream (53) from the second evaporator (52), the second portion (69) of the raw water stream (53) having a higher concentration of the contaminants than when it was introduced into the second evaporator (52); and passing the second portion (68) of the reformate (60) withdrawn from the second evaporator (52) to the gas separator (210) and separating the second portion (68) of the reformate (60) in the gas separator (210) to produce at least a portion of the $H_2$-containing product gas stream (200) and at least a portion of a by-product gas stream (250).

Aspect 15. The process of any one of Aspects 1 through 9, wherein the at least a portion (62) or a third portion (86) of the reformate (60) transfers heat to a third portion (65) of the raw water stream (53) by indirect heat transfer in a third evaporator (83) of the plurality of evaporators.

Aspect 16. The process of Aspect 15, wherein the at least a portion (62) of the reformate (60) transfers heat to the third portion (65) of the raw water stream (53) by indirect heat transfer in the third evaporator (83) by:

passing the at least a portion (62) of the reformate (60) to the third evaporator (83);

passing the third portion (65) of the raw water stream (53) to the third evaporator (83); and heating the third portion (65) of the raw water stream (53) in the third evaporator (83) by indirect heat transfer with the at least a portion (62) of the reformate (60) thereby forming a third steam stream (46) by evaporating a portion of the third portion (65) of the raw water stream (53), thereby cooling the at least a portion (62) of the reformate (60), and concentrating the contaminants in the third portion (65) of the raw water stream (53).

The third portion (65) of the raw water stream (53) in which the contaminants are concentrated is the remainder of the third portion (65) of the raw water stream (53) introduced into the third evaporator (83) that has not been evaporated to form the third steam stream (46).

Aspect 17. The process of Aspect 16, further comprising:
withdrawing the third steam stream (46) from the third evaporator (83);
withdrawing the at least a portion (62) of the reformate (60) from the third evaporator (83); and
withdrawing the third portion (65) of the raw water stream (53) from the third evaporator (83), the third portion (65) of the raw water stream (53) having a higher concentration of the contaminants than when it was introduced into the third evaporator (83).

Aspect 18. The process of Aspect 15, wherein the third portion (86) of the reformate (60) transfers heat to the third portion (65) of the raw water stream (53) by indirect heat transfer in the third evaporator (83) by:
passing the third portion (86) of the reformate (60) to the third evaporator (83);
passing the third portion (65) of the raw water stream (53) to the third evaporator (83); and
heating the third portion (65) of the raw water stream (53) in the third evaporator (83) by indirect heat transfer with the third portion (86) of the reformate (60) thereby forming a third steam stream (46) by evaporating a portion of the third portion (65) of the raw water stream (53), thereby cooling the third portion (86) of the reformate (60), and concentrating the contaminants in the third portion (65) of the raw water stream (53).

The third portion (65) of the raw water stream (53) in which the contaminants are concentrated is the remainder of the third portion (65) of the raw water stream (53) introduced into the third evaporator (83) that has not been evaporated to form the third steam stream (46).

Aspect 19. The process of Aspect 18, further comprising:
withdrawing the third steam stream (46) from the third evaporator (83);
withdrawing the third portion (86) of the reformate (60) from the third evaporator (83),
withdrawing the third portion (65) of the raw water stream (53) from the third evaporator (83), the third portion (65) of the raw water stream (53) having a higher concentration of the contaminants than when it was introduced into the third evaporator (83); and
passing the third portion (86) of the reformate (60) withdrawn from the third evaporator (83) to the gas separator (210) and separating the third portion (86) of the reformate (60) in the gas separator (210) to produce at least a portion of the $H_2$-containing product gas stream (200) and at least a portion of a by-product gas stream (250).

Aspect 20. A system for producing a $H_2$-containing product gas (200) and for producing purified water (42) from a raw water stream (53) containing contaminants, the system comprising:
a thermal water purification system (16) comprising a plurality of evaporators (51, 52, 58, 83), wherein at least a first evaporator (58) of the plurality of evaporators comprises a first heat transfer coil (81) operatively connected to a source (100) of a reformate comprising $H_2$, CO, $CH_4$, and $H_2O$ to receive reformate from the source of the reformate, and wherein each evaporator (83, 52, 58) of the plurality of evaporators except for a second evaporator (51) of the plurality of evaporators comprises a heat transfer coil operatively connected to a respective steam source (51, 83, 52) to receive steam from the respective steam source; and
a gas separator (210) operatively connected to the thermal water purification system (16) to receive reformate from the thermal water purification system.

Aspect 21. The system of Aspect 20, wherein each of the plurality of evaporators (51, 52, 58, 83) comprises a heat transfer coil operatively connected to the source of the reformate (100) to receive reformate from the source of the reformate.

Aspect 22. The process of Aspect 10, wherein the at least a portion (62) of the reformate (60) transfers heat to the at least a portion (63) of the raw water stream (53) by indirect heat transfer in the second evaporator (52) by:
passing the at least a portion (62) of the reformate (60) to the second evaporator (52),
passing the at least a portion (63) of the raw water stream (53) to the second evaporator (52);
heating the at least a portion (63) of the raw water stream (53) in the second evaporator (52) by indirect heat transfer with the at least a portion (62) of the reformate (60) thereby forming the first steam stream (41) by evaporating a portion of the at least a portion (63) of the raw water stream (53), thereby cooling the at least a portion (62) of the reformate (60), and concentrating the contaminants in the at least a portion (63) of the raw water stream (53).

The at least a portion (63) of the raw water stream (53) in which the contaminants are concentrated is the remainder of the at least a portion (63) of the raw water stream (53) introduced into the second evaporator (52) that has not been evaporated to form the first steam stream (41).

Aspect 23. The process of Aspect 22, further comprising:
withdrawing the first steam stream (41) from the second evaporator (52);
withdrawing the at least a portion (62) of the reformate (60) from the second evaporator (52); and
withdrawing the at least a portion (63) of the raw water stream (53) from the second evaporator (52), the at least a portion (63) of the raw water stream (53) having a higher concentration of the contaminants than when it was introduced into the second evaporator (52).

Aspect 24. The process of Aspect 10, wherein the second portion (68) of the reformate (60) transfers heat to the at least a portion (63) of the raw water stream (53) by indirect heat transfer in the second evaporator (52) by:
passing the second portion (68) of the reformate (60) to the second evaporator (52),
passing the at least a portion (63) of the raw water stream (53) to the second evaporator (52);
heating the at least a portion (63) of the raw water stream (53) in the second evaporator (52) by indirect heat transfer with the second portion (68) of the reformate (60) thereby forming the first steam stream (41) by evaporating a portion of the at least a portion (63) of the raw water stream (53), thereby cooling the second portion (68) of the reformate (60), and concentrating the contaminants in the at least a portion (63) of the raw water stream (53).

The at least a portion (63) of the raw water stream (53) in which the contaminants are concentrated is the remainder of the at least a portion (63) of the raw water stream (53) introduced into the second evaporator (52) that has not been evaporated to form the first steam stream (41).

Aspect 25. The process of Aspect 24, further comprising:
withdrawing the first steam stream (41) from the second evaporator (52);
withdrawing the second portion (68) of the reformate (60) from the second evaporator (52);
withdrawing the at least a portion (63) of the raw water stream (53) from the second evaporator (52), the at least a portion (63) of the raw water stream (53) having a higher concentration of the contaminants than when it was introduced into the second evaporator (52); and
passing the second portion (68) of the reformate (60) withdrawn from the second evaporator (52) to the gas separator (210) and separating the second portion (68) of the reformate (60) in the gas separator (210) to produce at least a portion of the $H_2$-containing product gas stream (200) and at least a portion of a by-product gas stream (250).

Aspect 26. The process of any one of Aspects 1 through 9, wherein the at least a portion (62) or a third portion (86) of the reformate (60) transfers heat to the at least a portion (63) or a second portion (69) of the raw water stream (53) by indirect heat transfer in a third evaporator (83) of the plurality of evaporators.

Aspect 27. The process of Aspect 26, wherein the at least a portion (62) of the reformate (60) transfers heat to the at least a portion (63) of the raw water stream (53) by indirect heat transfer in the third evaporator (83) by:
passing the at least a portion (62) of the reformate (60) to the third evaporator (83);
passing the at least a portion (63) of the raw water stream (53) to the third evaporator (83); and
heating the at least a portion (63) of the raw water stream (53) in the third evaporator (83) by indirect heat transfer with the at least a portion (62) of the reformate (60) thereby forming a third steam stream (46) by evaporating a portion of the at least a portion (63) of the raw water stream (53), thereby cooling the at least a portion (62) of the reformate (60) and concentrating the contaminants in the at least a portion (63) of the raw water stream (53).
The at least a portion (63) of the raw water stream (53) in which the contaminants are concentrated is the remainder of the at least a portion (63) of the raw water stream (53) introduced into the third evaporator (83) that has not been evaporated to form the third steam stream (46).

Aspect 28. The process of Aspect 27, further comprising:
withdrawing the third steam stream (46) from the second evaporator (52);
withdrawing the at least a portion (62) of the reformate (60) from the third evaporator (83); and
withdrawing the at least a portion (63) of the raw water stream (53) from the third evaporator (83), the at least a portion (63) of the raw water stream (53) having a higher concentration of the contaminants than when it was introduced into the third evaporator (83).

Aspect 29. The process of Aspect 26, wherein the third portion (86) of the reformate (60) transfers heat to the at least a portion (63) of the raw water stream (53) by indirect heat transfer in the third evaporator (83) by:
passing the third portion (86) of the reformate (60) to the third evaporator (83);
passing the at least a portion (63) of the raw water stream (53) to the third evaporator (83); and
heating the at least a portion (63) of the raw water stream (53) in the third evaporator (83) by indirect heat transfer with the third portion (86) of the reformate (60) thereby forming a third steam stream (46) by evaporating a portion of the at least a portion (63) of the raw water stream (53), thereby cooling the third portion (86) of the reformate (60), and concentrating the contaminants in the at least a portion (63) of the raw water stream (53).
The at least a portion (63) of the raw water stream (53) in which the contaminants are concentrated is the remainder of the at least a portion (63) of the raw water stream (53) introduced into the third evaporator (83) that has not been evaporated to form the third steam stream (46).

Aspect 30. The process of Aspect 29, further comprising:
withdrawing the third steam stream (46) from the third evaporator (83);
withdrawing the third portion (86) of the reformate (60) from the third evaporator (83);
withdrawing the at least a portion (63) of the raw water stream (53) from the third evaporator (83), the at least a portion (63) of the raw water stream (53) having a higher concentration of the contaminants than when it was introduced into the third evaporator (83); and
passing the third portion (86) of the reformate (60) withdrawn from the third evaporator (83) to the gas separator (210) and separating the third portion (86) of the reformate (60) in the gas separator (210) to produce at least a portion of the $H_2$-containing product gas stream (200) and at least a portion of a by-product gas stream (250).

Aspect 31. The process of any one of Aspects 1 through 19 and 22 through 30, further comprising:
passing the second steam stream (43) to a condenser (134) for condensation thereof thereby forming a second condensate stream from the second steam stream (43); and
withdrawing the second condensate stream from the condenser (134), wherein the purified water (42) also comprises the second condensate stream.

Aspect 32. The process of Aspect 31, wherein heat is transferred by indirect heat exchange from the second steam stream (43) to the raw water stream (53) in the condenser (134).

Aspect 33. A system for producing a $H_2$-containing product gas (200) and for producing purified water (42) from a raw water stream (53) containing contaminants, the system comprising:
a thermal water purification system (16) comprising a plurality of evaporators (52, 58), wherein at least a first evaporator (58) of the plurality of evaporators comprises a first heat transfer coil (81) operatively connected to a source (100) of a reformate comprising $H_2$, CO, $CH_4$, and $H_2O$ to receive reformate from the source of the reformate and a second heat transfer coil (57) operatively connected to a steam source to receive steam from the steam source; and
a gas separator (210) operatively connected to the first heat transfer coil (81) to receive reformate from the first heat transfer coil.

Aspect 34. The system of Aspect 33, wherein the steam source is a second evaporator (52) of the plurality of evaporators and the source of the reformate is a steam-hydrocarbon reforming system comprising a reformer furnace (100).

Aspect 35. The system of Aspect 33 or Aspect 34 wherein the gas separator (210) is a pressure swing adsorber.

Aspect 36. The system of any one of Aspects 33 through 35, wherein the first heat transfer coil (81) is operatively connected to a third heat transfer coil (59) contained in the second evaporator (52) to receive the reformate from the third heat transfer coil (59), and the third heat transfer coil (59) is operatively connected to the source (100) of the reformate to receive the reformate from the source of the reformate.

Aspect 37. The system of any one of Aspects 33 through 35, wherein at least a second evaporator (52) of the plurality of evaporators comprises a heat transfer coil (59) operatively connected to the source of the reformate (100) to receive the reformate from the source of the reformate.

DETAILED DESCRIPTION

Figure 1:
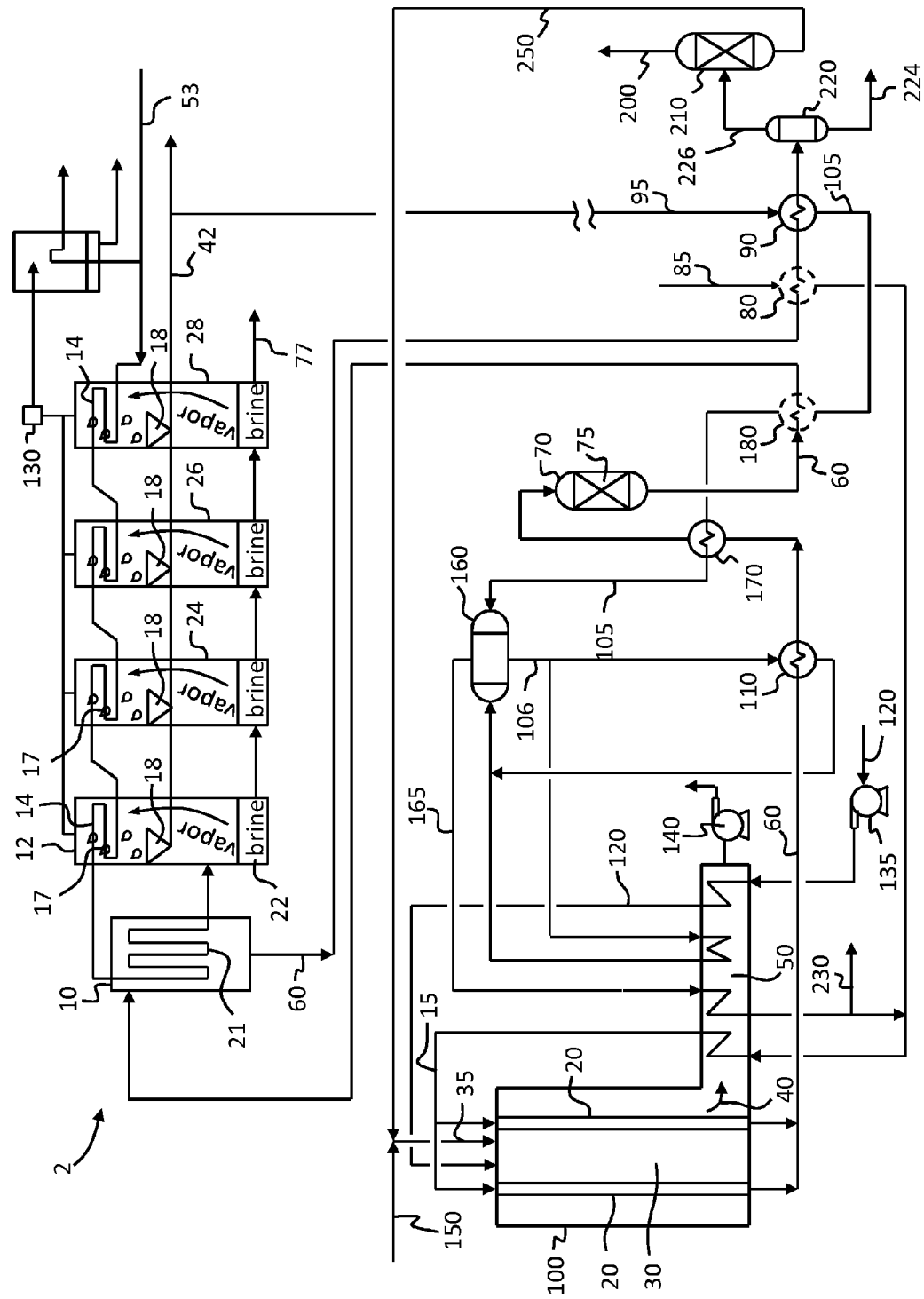
FIG. 1 is a process flow diagram of an integrated steam-hydrocarbon reforming process and multi-stage flash process where raw water is heated by indirect heat transfer with reformate without using a working fluid.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity. The term "and/or" placed between a first entity and a second entity means one of (1) the first entity, (2) the second entity, and (3) the first entity and the second entity. The term "and/or" placed between the last two entities of a list of 3 or more entities means at least one of the entities in the list.

The phrase "at least a portion" means "a portion or all." The at least a portion of a stream may have the same composition as the stream from which it is derived. The at least a portion of a stream may have a different composition to that of the stream from which it is derived. The at least a portion of a stream may include specific components of the stream from which it is derived.

As used herein, "first," "second," "third," etc. are used to distinguish from among a plurality of features and/or steps and does not indicate the relative position in time or space.

As used herein, the term "catalyst" refers to a support, catalytic material, and any other additives which may be present on the support.

As used herein a "divided portion" of a stream is a portion having the same chemical composition as the stream from which it was taken.

The term "depleted" means having a lesser mole % concentration of the indicated component than the original stream from which it was formed. "Depleted" does not mean that the stream is completely lacking the indicated component.

As used herein, "heat" and "heating" may include both sensible and latent heat and heating.

As used herein, "raw water" is any impure water, for example, one or more of salt water (ocean water, seawater, brackish water), surface water such as a stream, river, or lake, groundwater, municipal/industrial reuse or recycled water, or waste water from an industrial process, such as rejected water from a steam methane reforming process such as the process condensate. The process condensate is the water condensed from the reformate stream of the SMR process. Raw water is generally less pure than conventional industrial feed water, such as potable water.

As used herein, "purified water" means any distilled water (i.e. distillate or condensed water) from a thermal water purification process.

As used herein, "reformate" or "a reformate stream" is any stream comprising hydrogen and carbon monoxide formed from the reforming reaction of a hydrocarbon and steam.

As used herein, "indirect heat transfer" is heat transfer from one stream to another stream where the streams are not mixed together. Indirect heat transfer includes, for example, transfer of heat from a first fluid to a second fluid in a heat exchanger where the fluids are separated by plates or tubes. Indirect heat transfer includes transfer of heat from a first fluid to a second fluid where an intermediate working fluid is used to carry the heat from the first fluid to the second fluid. The first fluid may evaporate a working fluid, e.g. steam, in an evaporator, the working fluid passed to another heat exchanger or condenser, where the working fluid transfers heat to the second fluid. Indirect heat transfer from the first fluid to a second fluid using a working fluid may be accommodated using a heat pipe, thermosyphon or the like.

As used herein, "direct heat transfer" is heat transfer from one stream to another stream where the streams are intimately mixed together. Direct heat transfer includes, for example, humidification where water is sprayed directly into a hot air stream and the heat from the air evaporates the water.

In the figures, conduits are depicted as lines with arrows connecting one or more other components of the system. Each such conduit is operatively connected to an outlet of a component (i.e., the component from which the line originates) and an inlet of another component (i.e., the component at which the arrow terminates) such that a gas and/or liquid can be carried therebetween. In addition, components of the system can be operatively connected to each other via other components of the system that may separate them (e.g., evaporators, heating coils, etc.). Operatively connecting two or more components such that a gas and/or liquid can be carried therebetween can involve any suitable methods known in the art, including the use of flanged conduits, gaskets, and bolts.

In the claims, letters (e.g., (a), (b), (c), (d), etc.) or roman numerals (e.g., (i), (ii), (iii), (iv), etc.) may be used to identify claimed process steps. These letters or roman numerals are used to aid in referring to the process steps and are not intended to indicate the order in which claimed steps are performed, unless and only to the extent that such order is specifically recited in the claims.

The present invention relates to a system and process for producing a $H_2$-containing product and for producing purified water. The $H_2$-containing product may be a purified $H_2$ product gas or a synthesis gas having a desired $H_2$:CO molar ratio. The purified water may be desalinated water, i.e. purified water from salt water. For the purposes of the present disclosure, "desalinated water" means water from which 99-100 wt % of salt originally present has been removed.

The present invention relates to heat integration between a catalytic steam-hydrocarbon reforming process and thermal water purification process. The catalytic steam-hydrocarbon reforming process uses a large amount of water for reaction (e.g. $CH_4+2H_2O \rightarrow 4H_2+CO_2$) and production of high pressure steam as a co-product. The process also produces a large amount of low level heat. Thermal water purification produces purified water from raw water, and its energy source is low level heat. These two processes complement each other in that catalytic steam-hydrocarbon reforming consumes water and generates low level heat, whereas thermal water purification consumes low level heat and generates water. The present invention exploits this good match and achieves reduction in the total capital and energy cost of the integrated process.

A thermal water purification process as used herein is any process that uses a heat source to evaporate raw water and condenses the evaporated water vapor into a condensate or distillate (i.e. the purified water). The thermal water purification process may be, for example, a known commercial thermal desalination process such as multi-stage flash (MSF) or multiple effect distillation (MED).

Catalytic steam-hydrocarbon reforming has heretofore not been integrated with thermal water purification, even though catalytic steam-hydrocarbon reforming produces a large amount of low level heat. No specific integration schemes have been disclosed up to now.

Figure 2:
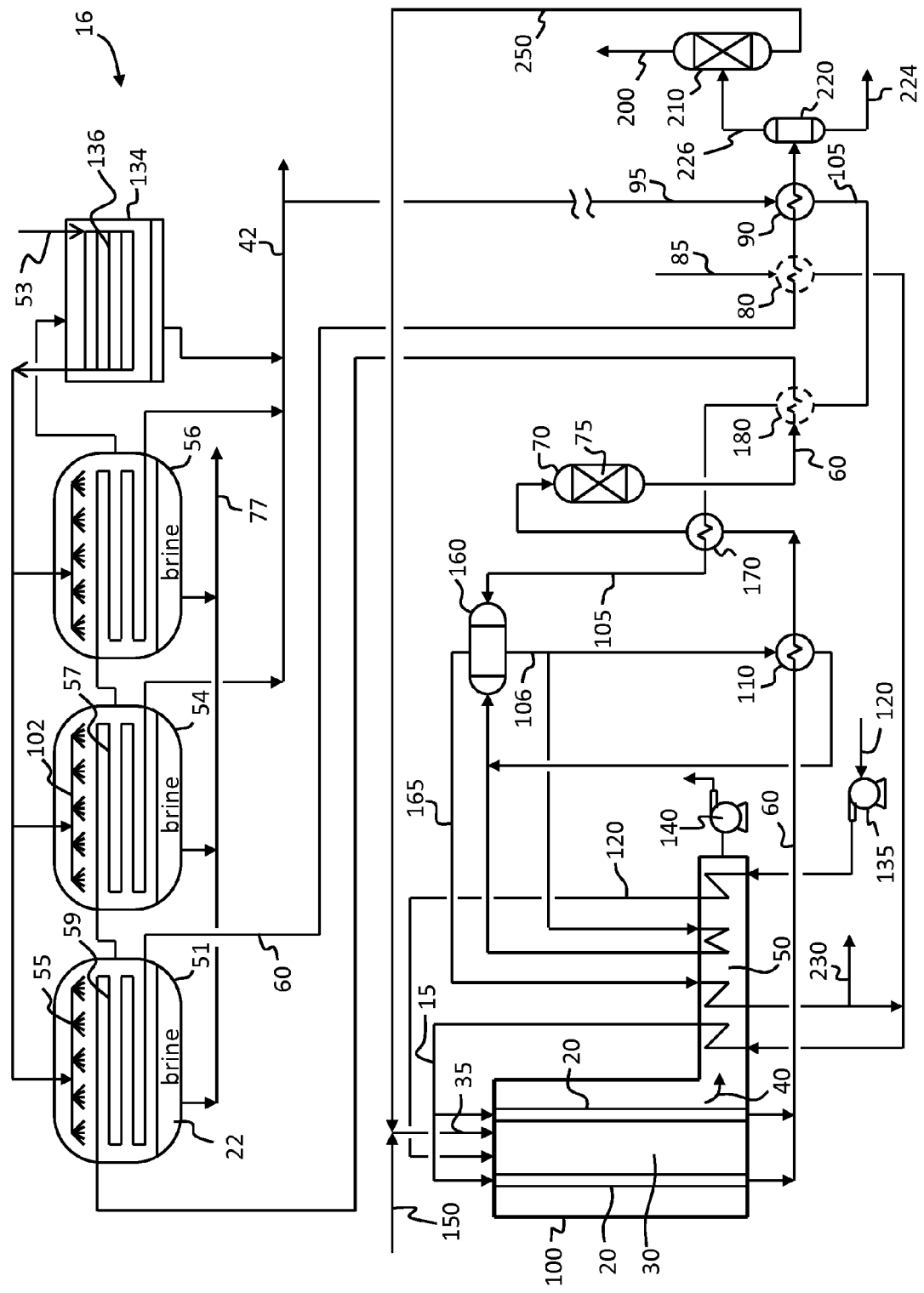
FIG. 2 is a process flow diagram of an integrated steam-hydrocarbon reforming process and multiple effect distillation process where raw water is heated by indirect heat transfer with reformate without using a working fluid.
Figure 3:
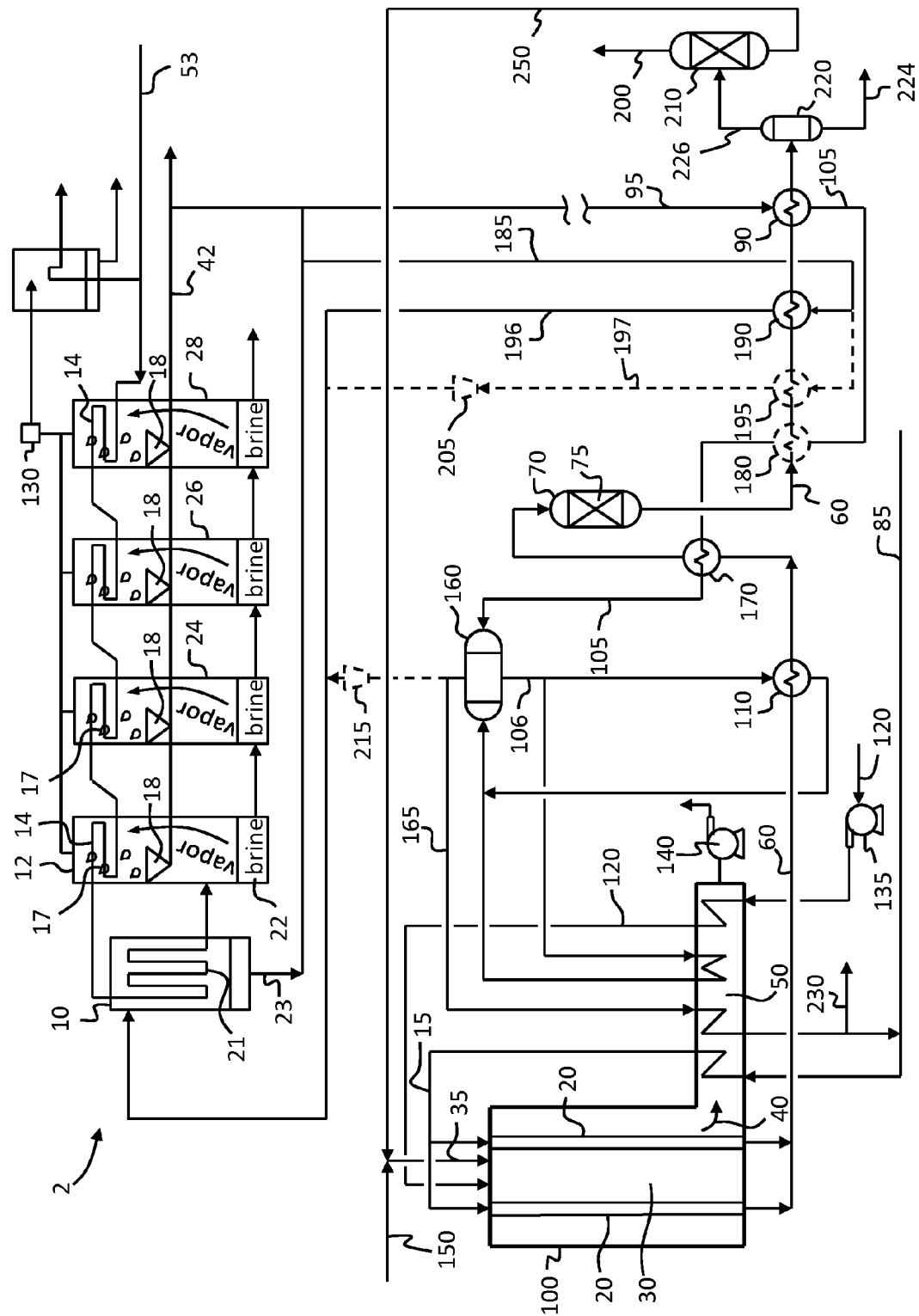
FIG. 3 is a process flow diagram of an integrated steam-hydrocarbon reforming process and multi-stage flash process where raw water is heated by indirect heat transfer with reformate using a working fluid.
Figure 4:
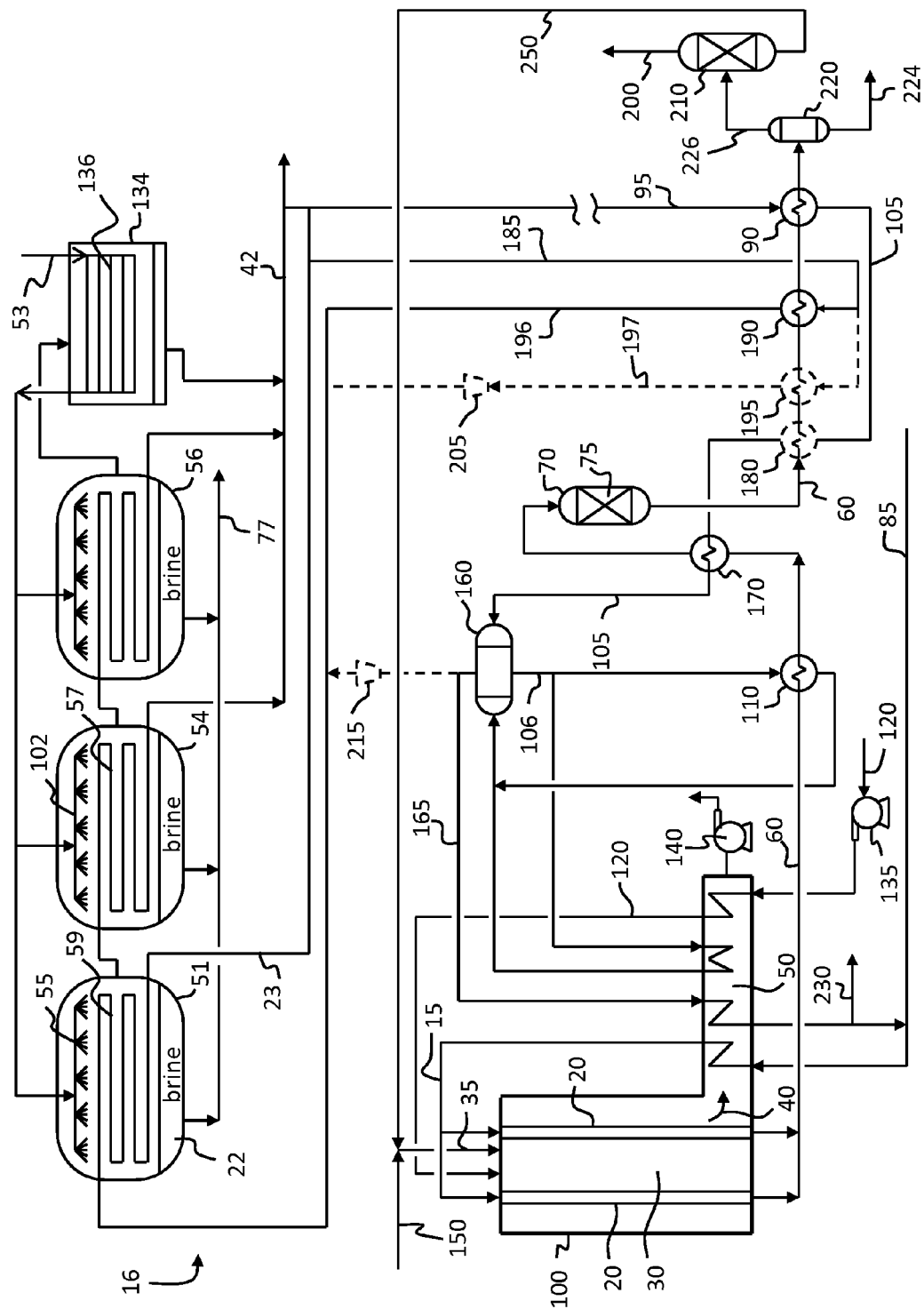
FIG. 4 is a process flow diagram of an integrated steam-hydrocarbon reforming process and multiple effect distillation process where raw water is heated by indirect heat transfer with reformate using a working fluid.
Figure 5:
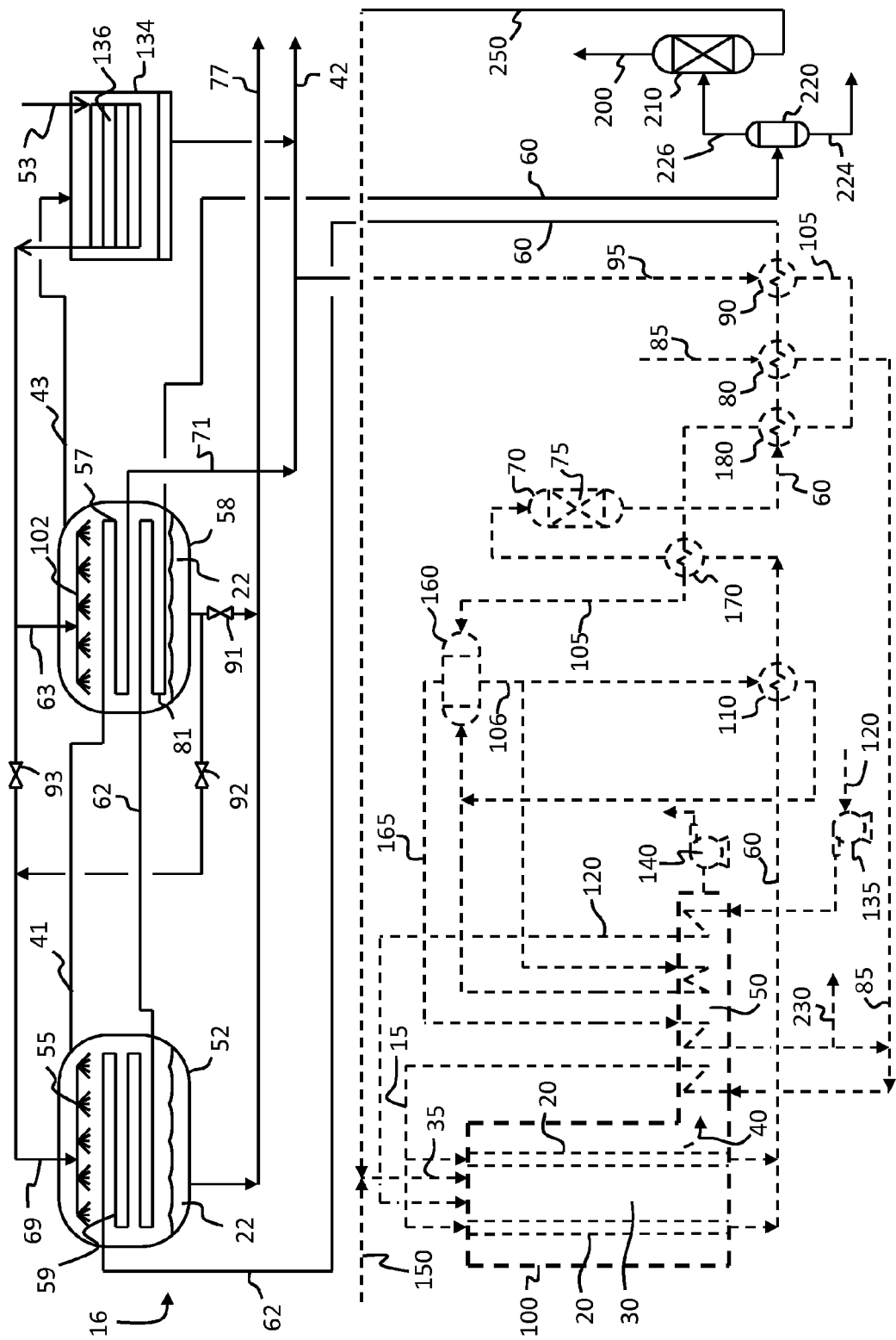
FIG. 5 is a process flow diagram of an integrated steam-hydrocarbon reforming process and multiple effect distillation process with two stages where raw water is heated by indirect heat transfer with reformate without using a working fluid.
Figure 6:
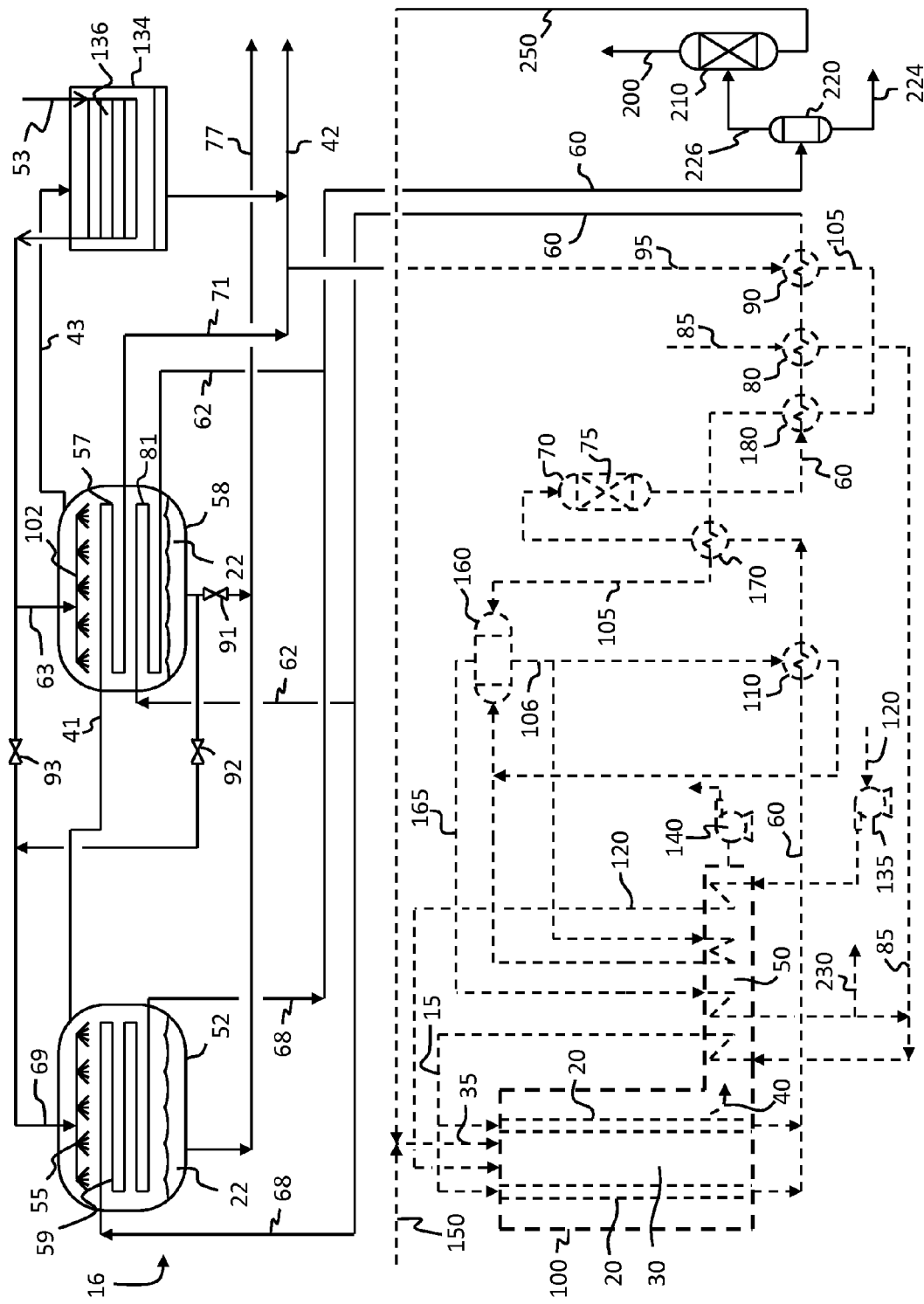
FIG. 6 is a process flow diagram of an integrated steam-hydrocarbon reforming process and multiple effect distillation process with two stages where raw water is heated by indirect heat transfer with reformate without using a working fluid.
Figure 7:
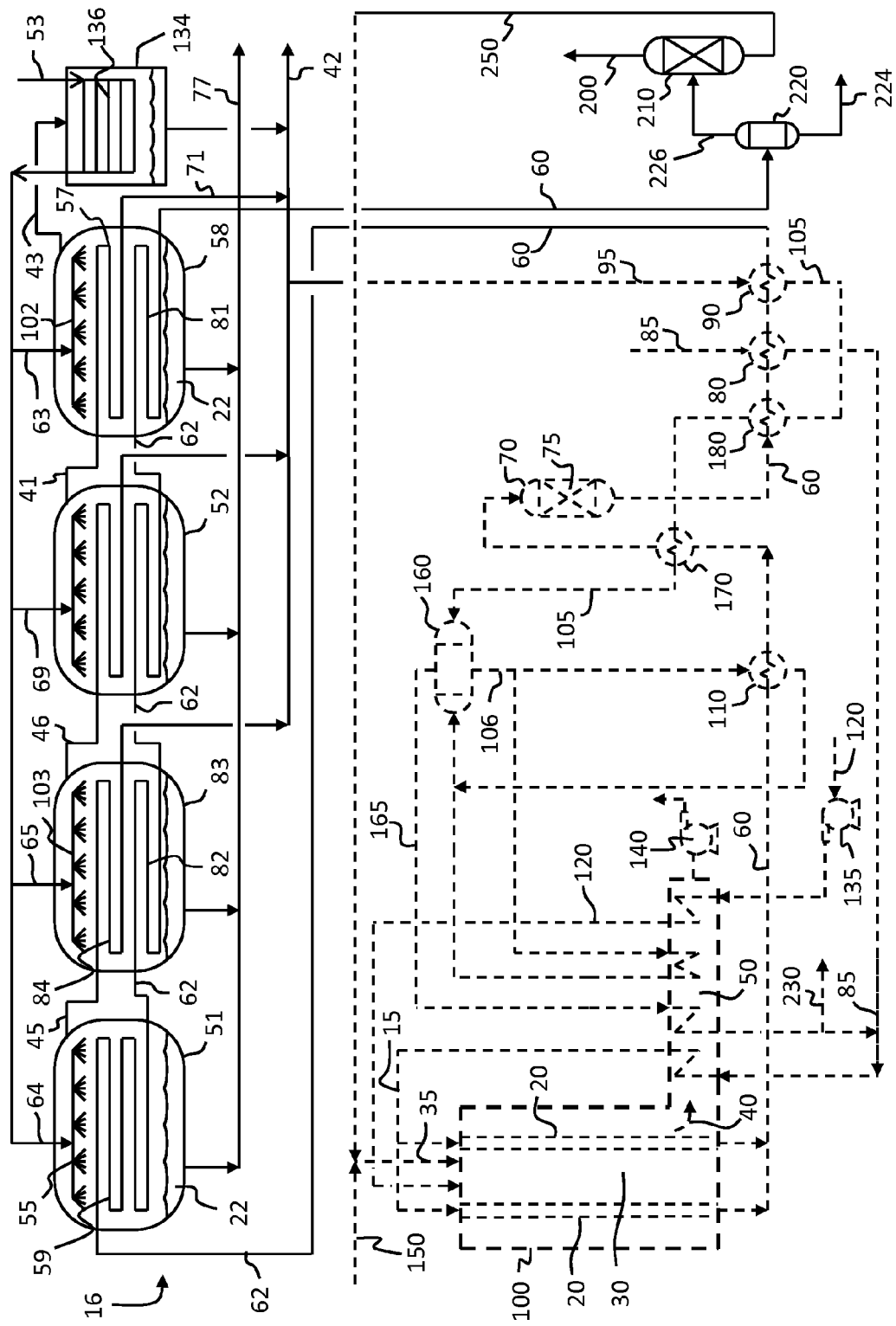
FIG. 7 is a process flow diagram of an integrated steam-hydrocarbon reforming process and multiple effect distillation process with four stages where raw water is heated by indirect heat transfer with reformate without using a working fluid.
Figure 8:
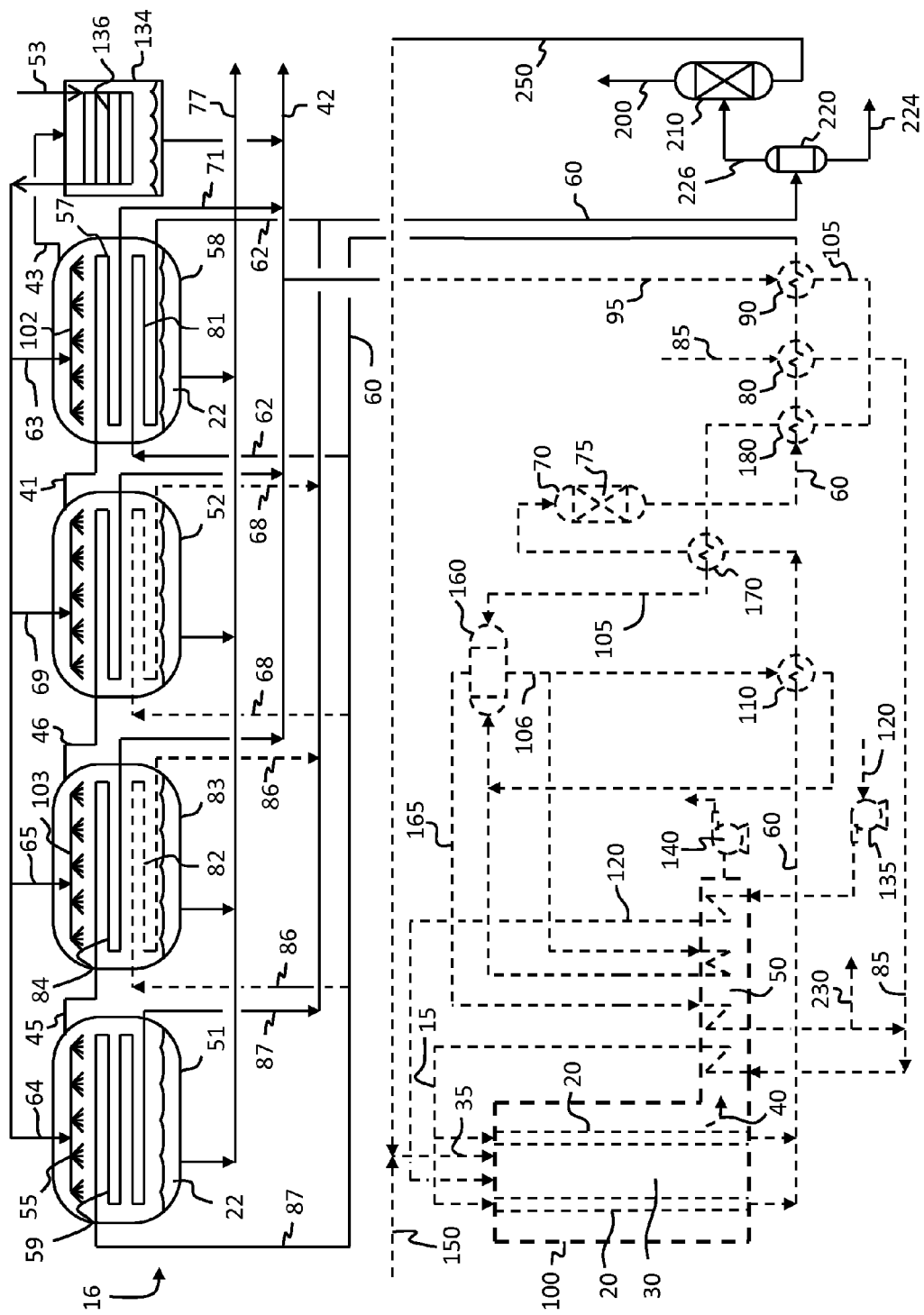
FIG. 8 is a process flow diagram of an integrated steam-hydrocarbon reforming process and multiple effect distillation process with four stages where raw water is heated by indirect heat transfer with reformate without using a working fluid.
Figure 9:
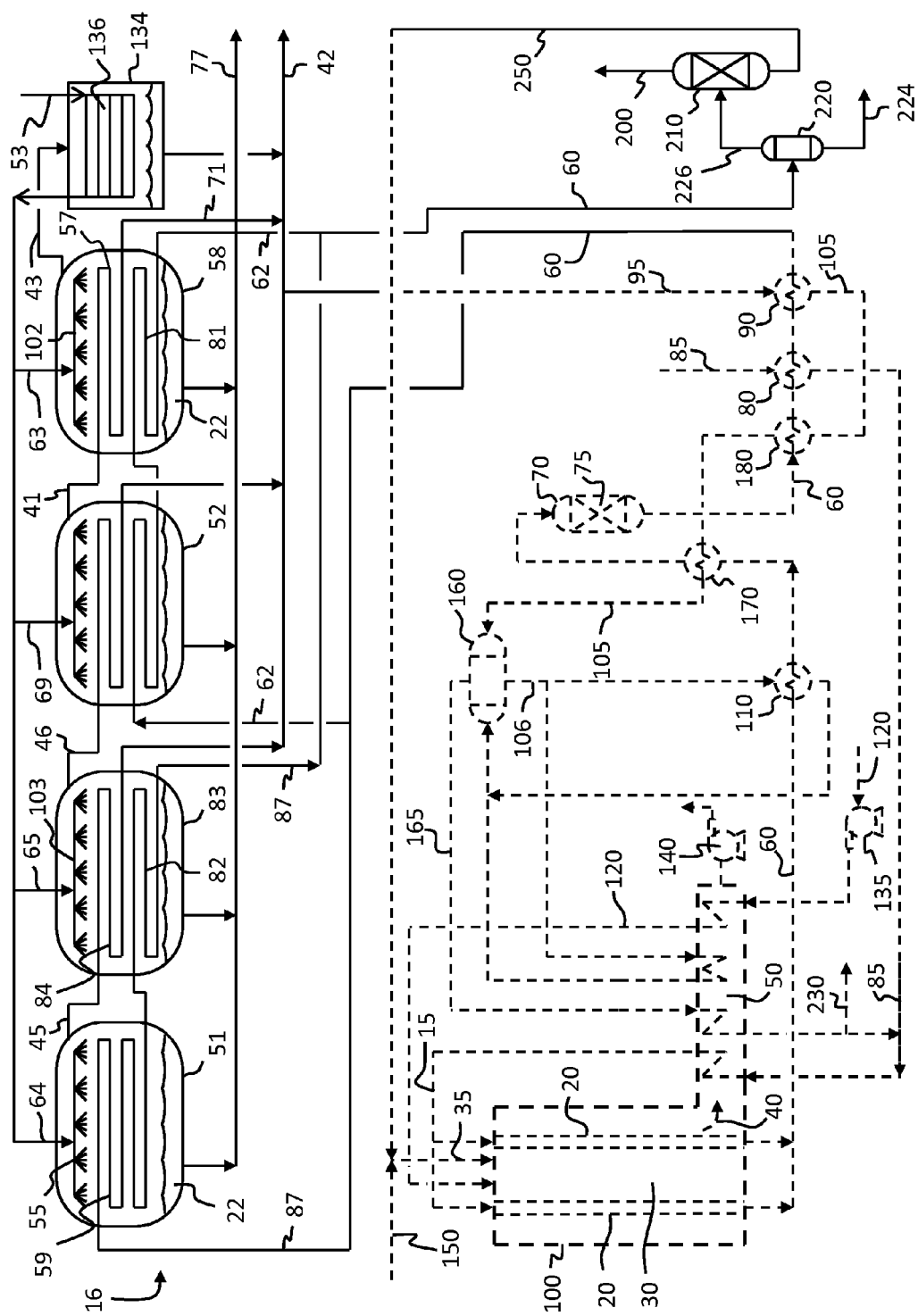
FIG. 9 is a process flow diagram of an integrated steam-hydrocarbon reforming process and multiple effect distillation process with two pairs of stages where raw water is heated by indirect heat transfer with reformate without using a working fluid.

Referring now to the drawings, wherein like reference numbers refer to like elements throughout the several views, FIGS. 1 and 3 show process flow diagrams for various arrangements whereby a steam-hydrocarbon reforming process is integrated with a Multi-Stage Flash (MSF) thermal water purification process for producing a $H_2$-containing product 200 and purified water 42. FIGS. 2 and 4 show process flow diagrams for various arrangements whereby a steam-hydrocarbon reforming process is integrated with a Multiple Effect Distillation (MED) thermal water purification process for producing a $H_2$-containing product 200 and purified water 42. FIGS. 5 and 6 show process flow diagrams for embodiments of the present invention comprising an integrated steam-hydrocarbon reforming process and MED process with two stages where raw water is heated by indirect heat transfer with reformate without using a working fluid. FIGS. 7 and 8 show process flow diagrams for embodiments of the present invention comprising an integrated steam-hydrocarbon reforming process and MED process with four stages where raw water is heated by indirect heat transfer with reformate without using a working fluid. FIG. 9 shows a process flow diagram for an embodiment of the present invention comprising an integrated steam-hydrocarbon reforming process and hybrid MED process with two pairs of stages where raw water is heated by indirect heat transfer with reformate without using a working fluid.

It should be noted that the embodiments of FIGS. 1 through 4 have been included in this application to provide context for the present invention, but are not within the scope of the claims of the present invention.

The steam-hydrocarbon reforming process of embodiments of the present invention utilizes catalytic steam-hydrocarbon reforming. Catalytic steam-hydrocarbon reforming, also called steam methane reforming (SMR), catalytic steam reforming, or steam reforming, is defined as any process used to convert reformer feedstock into synthesis gas by reaction with steam over a catalyst. Synthesis gas, commonly called syngas, is any mixture comprising hydrogen and carbon monoxide. The reforming reaction is an endothermic reaction and may be described generally as $C_nH_m+n\,H_2O \rightarrow nCO+(m/2+n)H_2$. Hydrogen is generated when synthesis gas is generated.

The multiple effect distillation process 16 of the embodiments of FIGS. 5-9 utilizes a reformate 60 that is withdrawn from the steam-hydrocarbon reforming process. The reformate 60 may be produced by introducing a reformer feed gas mixture 15 into a plurality of catalyst-containing reformer tubes 20 in the reformer furnace 100, reacting the reformer feed gas mixture 15 in a reforming reaction under reaction conditions effective to form a reformate 60 comprising $H_2$, CO, $CH_4$, and $H_2O$. The reformate 60 may then be withdrawn from the catalyst-containing reformer tubes 20 of the reformer furnace 100.

The reformer feed gas mixture 15 may comprise a hydrocarbon feedstock and steam, or a mixture of prereformed hydrocarbon feedstock and steam. Feedstock may be natural gas, methane, naphtha, propane, refinery fuel gas, refinery off-gas, or other suitable reformer feedstock known in the art.

The reforming reaction may take place in the plurality of catalyst-containing reformer tubes 20 in reformer furnace 100. A reformer furnace, also called a catalytic steam reformer, steam methane reformer, and steam-hydrocarbon reformer, is defined herein as any fired furnace used to convert feedstock containing elemental hydrogen and carbon to synthesis gas by a reaction with steam over a catalyst with heat provided by combustion of a fuel.

Reformer furnaces with a plurality of catalyst-containing reformer tubes, i.e. tubular reformers, are well known in the art. Any suitable number of catalyst-containing reformer tubes may be used. Suitable materials and methods of construction are known. Catalyst in the catalyst-containing reformer tubes may be any suitable catalyst known in the art, for example, a supported catalyst comprising nickel.

The reaction conditions effective to form the reformate 60 in the plurality of catalyst-containing reformer tubes may comprise a first temperature ranging from 500° C. to 1000° C. and a first pressure ranging from 203 kPa to 5,066 kPa (absolute).

Saturated boiler feed water 106 from steam drum 160 may be heated by indirect heat transfer with the reformate 60 withdrawn from the plurality of catalyst-containing reformer tubes 20 in a first heat exchanger 110 thereby forming high pressure steam 165 having a pressure ranging from 1.5 to 12.5 MPa (absolute). The reformer feed gas mixture 15 may include the high pressure steam 165.

As shown in the figures, saturated boiler feed water 106 may be withdrawn from steam drum 160 and passed to heat exchanger 110 where the saturated boiler feed water 106 may be heated by indirect heat exchange with the reformate 60 in heat exchanger 110. The heated boiler feed water may be returned to steam drum 160 where steam and water are separated. High pressure steam 165 may be withdrawn from the steam drum and saturated boiler feed water may be passed to various heat exchangers to be heated.

Boiler feed water 105 may be heated in a second heat exchanger 170 by indirect heat transfer with reformate 60 from the first heat exchanger 110. As shown in the figures, the boiler feed water 105 may be heated in the second heat exchanger 170 before being heated in the first heat exchanger 110.

Boiler feed water is water that meets certain purity requirements for use in boilers and stream drums.

As shown in the figures, the reformate 60 may be passed from the second heat exchanger 170 to shift reactor 70. The process may comprise reacting the reformate 60 from the second heat exchanger 170 in the presence of a shift catalyst 75 under reaction conditions effective to form additional hydrogen in the reformate 60. Additional hydrogen gas may be obtained by the catalytic reaction of carbon monoxide and steam. This reaction is exothermic and is commonly referred to as the water-gas shift reaction or shift reaction: $CO+H_2O \rightarrow CO_2+H_2$. The reaction is effected by passing carbon monoxide and water through a bed of a suitable catalyst. The reaction conditions effective to form additional hydrogen in the reformate 60 may comprise a second temperature ranging from 190° C. to 500° C. and a second pressure ranging from 203 kPa to 5,066 kPa (absolute).

Any suitable shift catalyst may be used. The shift reactor may be a so-called high temperature shift (HTS), low temperature shift (LTS), medium temperature shift (MTS), or combination. Since the article "a" means "one or more," one or more shift reactors may be used in the process.

For high temperature shift, an inlet temperature in the range 310° C. to 370° C., and an outlet temperature in the range 400° C. to 500° C. are typical. Usually an iron oxide/chromia catalyst is used for high temperature shift.

For low temperature shift, an inlet temperature in the range 190° C. to 230° C., and an outlet temperature in the range 220° C. to 250° C. are typical. Usually a catalyst comprising metallic copper, zinc oxide, and one or more other difficultly reducible oxides such as alumina or chromia is used for low temperature shift For medium temperature shift, an inlet temperature in the range 190° C. to 230° C. and an outlet temperature of up to 350° C. are typical. A suitably formulated supported copper catalyst can be used for medium temperature shift. Medium temperature shift may be preferred for the present process.

A combination may include a sequence of high temperature shift, cooling by indirect heat exchange, and low temperature shift. If desired, either shift stage can be subdivided with interbed cooling.

As shown in the figures, the process may further comprise heating the boiler feed water 105 by indirect heat transfer with the reformate 60 from the shift reactor 70 in optional heat exchanger 180 prior to heating the raw water 53 by indirect heat transfer with the reformate 60 from shift reactor 70 wherein the boiler feed water 105 is heated by the reformate from shift reactor 70 before being heated in heat exchanger 170.

In various embodiments, boiler feed water 105 is not heated by reformate 60 leaving the shift reactor 70 and before the reformate 60 is used to heat raw water 53. In conventional catalytic hydrocarbon-reforming processes, omission of heat exchanger 180 will result in increased loss of low level heat to the environment (waste heat) and poor energy efficiency for the system. In the present case, in the embodiments of FIGS. 1 through 4, omission of heat exchanger 180 results in more low level heat being transferred from the reformate 60 to the raw water 53 through heat transfer coil 21, evaporator 51, or heat exchanger 190. In the embodiments of FIGS. 5 through 9, omission of heat exchanger 180 results in more low level heat being transferred from the reformate 60 to the raw water 53 through one or more evaporators of the multiple effect distillation process 16 (e.g., evaporators 52, 83, 51, and 58) and does not result in increased waste heat losses. As a result, in the embodiments of FIGS. 1 through 4, the temperature of the reformate 60 leaving the heat recovery system (e.g. heat exchanger 90) ranges from about 25° C. to 65° C., which is similar to the temperature leaving a deep heat recovery system in a conventional catalytic steam-hydrocarbon reforming process that includes heat exchanger 180. Similarly, in the embodiments of FIGS. 5 through 9, the multiple effect distillation process 16 can be operated such that temperature of the reformate 60 returned from the multiple effect distillation process 16 ranges from about 25° C. to 65° C. These embodiments are advantageous when the value of the water is much greater than the value of energy and/or when the demand for high pressure export steam is low or zero.

As shown in FIGS. 1 through 9, raw water 53 is heated by indirect heat transfer with a first steam stream 196 or the reformate 60 (after the reformate 60 undergoes the optional shift reaction), thereby heating the raw water 53 for purification of the raw water in a multi-stage flash process 2 as shown in FIGS. 1 and 3, or a multiple effect distillation process 16 as shown in FIGS. 2 and 4 through 9, to produce purified water 42. As the first steam stream 196 or reformate 60 gives up heat to the raw water 53, the first steam stream 196 or reformate 60 is cooled. The amount of heat transferred from the first steam stream 196 or reformate 60 to the raw water 53 may range between 115 to 2784 kJ per kg of make-up water 95.

The make-up water 95 may be further heated by indirect heat transfer with the reformate 60 in heat exchanger 90 prior to separating the reformate 60. In the embodiments of FIGS. 1 through 4, the temperature of the reformate 60 leaving heat exchanger 90 ranges from about 25° C. to about 65° C. or from about 35° C. to about 55° C.

"Make-up water" is water introduced into the catalytic steam-hydrocarbon reforming process as a feedstock stream. Make-up water can be boiler feed water quality or may need to be further treated to become boiler feed water quality. The amount of make-up water added to the system is the amount required for reaction in the catalytic steam-hydrocarbon reforming process plus the amount required for export steam production. In case excess steam in the reformate 60, which is condensed in knock-out drum 220 as process condensate 224, is not recycled to the catalytic steam-hydrocarbon reforming process, the amount of make-up water required is increased by the amount of process condensate.

The make-up water 95 may comprise purified water 42. The make-up water 95 may consist of purified water 42. A portion or all of the purified water 42 produced may be used as make-up water for the reforming process.

The purified water from thermal water purification processes can be boiler feed water quality. Direct use of the purified water will save on water treatment costs at the catalytic steam-hydrocarbon reforming plant. Use of purified water 42 as boiler feed water 105 can pay for itself if the total cost of the purified water 42 is less than the sum of raw water 53 cost plus the capital and operating cost of water treatment and deaeration in the catalytic steam-hydrocarbon reforming plant.

In case the purified water 42 is not boiler feed water quality, the purified water 42 may be treated by methods used for conventional make-up water treatment.

FIG. 1 shows reformate 60 passed to heating chamber 10 of a representative multi-stage flash process 2. Reformate 60 passes over metallic heat transfer coil 21, disposed internally of heating chamber 10 through which raw water 53 flows and is heated and subsequently enters first stage flash tank 12.

Raw water 53 enters heat transfer coil 14 of flash tank 28. Raw water inside coil 14 is heated by heat transfer as water vapor condenses against the heat transfer coil 14. Optionally, for distillation to occur at lower temperatures, either a vacuum pump or steam ejector 130 is connected to any or all of the flash tanks 12, 24, 26, or 28, lowering the internal tank pressure to below atmospheric pressure. The pressure is successively reduced at each stage from flash tank 12 through to flash tank 28.

Purified water condensate produced by this condensation process is collected in collector 18 of flash tank 28 and exits the tank as a stream of purified water 42.

The incoming raw water 53 is heated further as it passes through the heat transfer coils 14 of flash tanks 28, 26, 24, and then 12. Heated raw water exits flash tank 12 and enters the heat transfer coil 21 of heating chamber 10. Reformate 60 enters heating chamber 10 and contacts the heat transfer coil 21 to effect heat transfer to further heat raw water 53 passing internally through the heat transfer coil 21. Cooled reformate 60 produced as a result of this heat transfer exits the heating chamber 10.

Water vapor which condenses upon contact with coil 14 forms a purified water condensate 17 which drips from the coil 14 into collector 18 of each flash tank and is collected as purified water 42. Evaporation of the raw water causes the low quality reject water 22 in the bottom of the flash tanks to become increasingly concentrated in impurities. In the case of desalination of salt water, the low quality reject water 22 is brine and the brine in the bottom of the flash tanks becomes increasingly concentrated with salt. Low quality reject water 22 passes to flash tanks 24, 26, and 28, respectively, where the thermal water purification process repeats at progressively lower pressures. Low quality reject water which is concentrated in impurities exits flash tank 28 in low quality reject water 77 and is typically discharged.

Alternatively (not shown in the figures), a portion of the low quality reject is withdrawn and joins the raw water 53 as a portion of the feed water to the thermal water purification process. This low quality reject water recycle increases the conversion rate of the raw water into the purified water, also known as the recovery of the raw water. The higher the amount of recycled low quality reject water, the higher the impurity in the feed water to the thermal water purification process. The amount of recycled low quality reject water depends on the allowable impurity level of the feed water to the thermal water purification process.

In the embodiments shown in FIGS. 1 and 2 the cooled reformate 60 may be optionally further cooled by passing through optional heat exchanger 80 to heat hydrocarbon feedstock 85 by indirect heat transfer with the cooled reformate 60. In the embodiments of FIGS. 3 and 4, hydrocarbon feedstock 85 is not heated by heat exchange with reformate from shift reactor 70 or by heat exchange with cooled reformate after the reformate has heated raw water 53. In conventional catalytic steam-hydrocarbon reforming processes, omission of optional heat exchanger 80 results in increased loss of low level heat to the environment (waste heat) and poor energy efficiency. In the present case, omission of optional heat exchanger 80 results in more low level heat being transferred from the reformate 60 to the raw water 53, and does not result in increased waste heat. Even with the omission of optional heat exchanger 80, the temperature of the reformate 60 leaving heat exchanger 90 ranges from 25° C. to 65° C., similar to that of a conventional catalytic steam-hydrocarbon reforming process with a deep heat recovery system that normally contains optional heat exchanger 80.

In the embodiment shown in FIG. 1, the cooled reformate 60 returned from the multi-stage flash process 2 is further cooled by passing through heat exchanger 90 where make-up water 95 is heated. Make-up water 95 is heated in heat exchanger 90 before being heated in either of optional heat exchanger 180 or heat exchanger 170.

FIG. 2 illustrates an embodiment utilizing a representative multiple effect distillation process 16. FIG. 2 shows reformate 60 passed to heat transfer coil 59 of evaporator 51. Reformate 60 is cooled in heat transfer coil 59 as a result of heat transfer with raw water 53 brought into contact with the exterior of the coil 59, typically by spraying the raw water through spray bar 55. Cooled reformate is withdrawn from coil 59 and may be optionally further cooled by passing through optional heat exchanger 80 to heat hydrocarbon feedstock 85.

In the embodiment shown in FIG. 2, the reformate returned from the multiple effect distillation process 16 is further cooled by passing through heat exchanger 90 where make-up water 95 is heated. Make-up water 95 is heated in heat exchanger 90 for use as boiler feed water 105, which is then heated in either of optional heat exchanger 180 by the reformate from the shift reactor or heat exchanger 170.

The raw water 53 which is sprayed through spray bar 55 onto the exterior of the coil 59 of evaporator 51 undergoes evaporation to form water vapor due to heat transfer between the coil 59 heated by the reformate 60 passing internally therethrough. The water vapor so produced passes from evaporator 51 into heat transfer coil 57 disposed internally of another evaporator 54. Raw water 53 is sprayed onto the exterior of heat transfer coil 57 through spray bar 102, and the water vapor inside the coil 57 condenses within the heat transfer coil 57, exits evaporator 54 and is collected as water condensate in purified water 42. Water vapor produced by heat transfer in evaporator 54 is passed into evaporator 56 where the process is repeated, and so on for as many evaporators as are present in the system. Water vapor exiting the last evaporator in the series (evaporator 56 in FIG. 2) is condensed in condenser 134 by contact with heat transfer coil 136 through which cold raw water 53 is passed. Purified water condensate so produced is combined with that produced in the previous evaporators and collected as purified water 42. Low quality reject water 22 collected at the bottom of evaporator 51 is combined with low quality reject water 22 from the other evaporators 54 and 56 in low quality reject water 77, where the thermal water purification process continues optionally at progressively lower pressure operating conditions, and is later discharged.

The cooled reformate 60, after cooling in heat exchanger 90 is passed to knock-out drum 220 to remove water formed by condensation of steam, typically called process condensate. Process condensate 224 may be purified and reused, or alternatively discharged. Purified process condensate may be combined with make-up water 95 and heated in heat exchanger 90, optional heat exchanger 180, and/or heat exchanger 170.

The process condensate 224, along with the raw water 53, may be fed to the thermal water purification unit to purify the process condensate for reuse.

The cooled reformate 60 is separated after the reformate 60 heats the raw water 53 to produce the $H_2$-containing product 200 and a by-product gas 250. The reformate 60 may be separated by any known means for separating reformate. As shown in the figures, the reformate 60 may be separated by pressure swing adsorption in gas separator 210 to produce the $H_2$-containing product 200 and the by-product gas 250. The by-product gas 250 from a pressure swing adsorber is commonly called a tail gas. Alternatively, the reformate 60 may be cryogenically separated into synthesis gas products in a cold box (not shown).

As shown in the figures, a fuel 35 may be combusted with an oxidant gas 120 in the reformer furnace 100 external to the plurality of catalyst-containing reformer tubes 20 under conditions effective to combust the fuel 35 to form a combustion product gas 40 and generate heat to supply energy for reacting the reformer feed gas mixture 15 inside the plurality of catalyst-containing reformer tubes 20. The combustion product gas 40 may be withdrawn from the reformer furnace 100. Conditions effective to combust the fuel may comprise a temperature ranging from 600° C. to 1500° C. and a pressure ranging from 99 kPa to 101.3 kPa (absolute).

The fuel 35 may comprise by-product gas 250 from the means for separating the reformate 60, i.e. the gas separator 210. The fuel 35 may comprise supplemental fuel 150. The supplemental fuel is often called trim fuel. The supplemental fuel may be natural gas or other suitable fuel.

The fuel 35 and oxidant gas 120 are combusted external to the plurality of catalyst-containing reformer tubes 20 in the combustion section 30, (also called radiant section) of the reformer furnace 100. The combustion product gas 40 is passed from the combustion section 30 to the convection section 50 of the reformer furnace 100. In the convection section 50 of the reformer furnace 100, various streams are heated by the combustion product gas 40. The combustion product gas 40 may be withdrawn from the convection section through exhaust fan 140.

As shown in the figures, oxidant gas 120 may be compressed in compressor 135 and may be heated in a heat exchanger in the convection section 50 before being introduced for combustion. Boiler feed water may be withdrawn from steam drum 160, heated in a heat exchanger in the convection section 50 of the reformer furnace 100, and passed back to the steam drum 160 to make steam. Pressure swing adsorber tail gas may be heated in a heat exchanger (not shown) in the convection section 50 before being introduced for combustion.

High pressure steam 165 from the steam drum 160 may be superheated in a heat exchanger in the convection section 50 of the reformer furnace 100. At least a portion of the superheated steam (commonly called process steam) is blended with a hydrocarbon feedstock 85 to form the reformer feed gas mixture 15. A portion of the superheated steam may be exported as export steam 230.

The reformer feed gas mixture 15 may be further heated in a heat exchanger in the convection section 50 of the reformer furnace 100 before being passed to the plurality of catalyst-containing reformer tubes 20.

The superheated steam may be blended with a hydrocarbon feed, heated and passed to a prereformer to reform a portion of the blend. The prereformer may be an adiabatic prereformer. The mixture from the prereformer may be heated in the convection section 50 of the reformer furnace 100 before being passed to the plurality of catalyst-containing reformer tubes as the reformer feed gas mixture 15.

FIGS. 1 and 2, as well as FIGS. 5 through 9, illustrate processes wherein the step of heating raw water 53 does not include heating of an intermediate working fluid. Embodiments where no intermediate working fluid is used provide the advantage of not requiring a low pressure steam and/or medium pressure steam boiler. Eliminating one stage of heat exchange between the reformate 60 and the raw water 53 also increases the heat exchange temperature differences in the remaining heat exchangers, thereby providing advantages in capital cost and improved thermal efficiency.

FIG. 3 is an alternative embodiment of FIG. 1 where like numerals designate like components. FIG. 3 is an embodiment wherein the step of heating raw water includes heating of an intermediate working fluid. The embodiment shown in FIG. 3 operates similarly to the embodiment shown in FIG. 1. Differences are described below.

FIG. 4 is an alternative embodiment of FIG. 2 where like numerals designate like components. FIG. 4 is an embodiment wherein the step of heating raw water includes heating of an intermediate working fluid. The embodiment shown in FIG. 4 operates similarly to the embodiment shown in FIG. 2. Differences are described below.

In the embodiments shown in FIGS. 3 and 4, the step of heating raw water 53 by indirect heat transfer may comprise heating a working fluid 185 by indirect heat transfer with the reformate 60 in heat exchanger 190, and heating the raw water 53 by indirect heat transfer with the working fluid 185. The working fluid may be water. Water may be evaporated to form a first stream 196 of steam having a pressure ranging from 15.2 kPa to 304 kPa (absolute) or ranging from 20.3 kPa to 132 kPa, when heated by the reformate 60 in heat exchanger 190. The first stream 196 of steam is condensed to form condensate 23 when heating the raw water 53 and returned to heat exchanger 190 be re-evaporated.

The ratio of the mass flow rate of the first stream 196 of steam to the mass flow rate of the make-up water 95 may be greater than 0.05 and less than 1.2. This is a new operating condition that a conventional steam methane reformer has not used and would not use.

In the embodiments of FIGS. 3 and 4, steam may be optionally generated and expanded in a steam turbine to generate shaft work. In one option, working fluid water is evaporated to form a second stream 197 of steam having a pressure ranging from 280 kPa to 608 kPa or ranging from 304 kPa to 405 kPa. The reformate 60 from the shift reactor 70 heats the second stream 197 of steam prior to heating the first stream 196 of steam. The second stream 197 of steam is expanded to generate shaft work in steam turbine 205 prior to heating the raw water 53. The shaft work may be used in either or both of the reforming process and the thermal water purification process. The expanded steam is condensed to form condensate 29 when heating the raw water 53. In this option, the ratio of the sum of mass flow rates of the first stream 196 and the second stream 197 of steam to the mass flow rate of the make-up water 95 may be greater than 0.05 and less than 1.2. These embodiments are advantageous when the value of the water is much greater than the value of energy and/or when the demand for high pressure export steam is low or zero.

In the embodiments of FIGS. 3 and 4, another option for generating shaft work comprises expanding a portion of the high pressure steam 165 to generate shaft work in steam turbine 215. The shaft work may be used in the reforming process for pumping and compression and/or to generate electric power. Raw water may be heated by indirect heat transfer with the expanded steam thereby heating the raw water 53 for purification thereof in the multiple effect distillation process 16 or the multi-stage flash process 2. Generating shaft work from high pressure steam is not commonly practiced in conventional catalytic steam-hydrocarbon reforming processes because there is often no end use for the expanded steam. Capturing the value of the expanded steam requires using a condensing turbine, at the expense of a large capital expenditure. In the integrated process, the value of the expanded steam is captured as the energy source for thermal water purification without incurring additional capital expense. The integration synergy makes it an attractive practice to generate power in the catalytic steam-hydrocarbon reforming process when the value of electricity is high.

FIGS. 5 through 9 illustrate process flow diagrams for four embodiments of a steam-hydrocarbon reforming process integrated with an MED thermal water purification process for producing an $H_2$-containing product 200 and purified water 42. In each of these embodiments, the reformate 60 is used as a heat source in multiple evaporators, which can provide greater utilization of the heat from the reformate 60, lessen or eliminate the release of waste heat from the reformer furnace 100, and reduce or eliminate cost associated with equipment and utilities that otherwise may be needed to dissipate waste heat from the reformate 60 to the atmosphere. Many components of the steam-hydrocarbon reforming process shown in FIGS. 5 through 9 are the same as those in the embodiments shown in FIGS. 1 through 4 and, therefore, are identified with the same reference numerals as used in FIGS. 1 through 4 and will not be discussed in detail below.

In the exemplary embodiment shown in FIG. 5, all of the reformate 60 is passed to heat transfer coil 59 of evaporator 52. Reformate 60 is cooled in heat transfer coil 59 as a result of heat transfer with a portion 69 of raw water stream 53 brought into contact with the exterior of the coil 59, typically by spraying the raw water through spray bar 55. Cooled reformate is withdrawn from coil 59 and passed to a heat transfer coil 81 in another evaporator 58.

The raw water which is sprayed through spray bar 55 onto the exterior of the coil 59 of evaporator 52 undergoes evaporation to form water vapor due to heat transfer between the coil 59 heated by the reformate 60 passing internally therethrough. The steam stream 41 produced by the evaporation passes from evaporator 52 into heat transfer coil 57, which is located inside of evaporator 58. A portion 63 of raw water stream 53 is sprayed onto the exterior of heat transfer coil 57 and heat transfer coil 81 through spray bar 102, and the steam stream inside the coil 57 condenses within the heat transfer coil 57, exits evaporator 58 and is collected as water condensate stream 71. Steam stream 43 produced by heat transfer in evaporator 58 by contact with heat transfer coils 57 and 81 is withdrawn from evaporator 58 and condensed in condenser 134 by contact with heat transfer coil 136, through which cold raw water stream 53 is passed.

The purified water condensate produced is combined with the condensate produced in the evaporators and is collected in purified water 42. Low quality reject water 22 collected at the bottom of evaporator 52 is combined with low quality reject water 22 from evaporator 58 in low quality reject water 77, where it can later be utilized in another process or it can be discharged. In addition, valves 91 through 93 can be opened and closed such that the low quality reject water 22 is provided to each evaporator in series. More specifically, with valves 91 and 93 open and valve 92 closed, the raw water 53 and low quality reject water 22 will flow as previously discussed, However, with valves 91 and 93 closed and valve 92 open, the low quality reject water 22 from evaporator 58 will be provided to spray bar 55 of evaporator 52 instead of, or in addition to, a portion of raw water 53.

As shown in FIG. 5, unlike the embodiments of FIGS. 1 through 4, the reformate 60 returned from the multiple effect distillation process 16 is not passed through heat exchangers (e.g., optional heat exchanger 80 and heat exchanger 90) prior to being passed to knock-out drum 220 (also known as a knock-out pot). Knock-out drum 220 separates process condensate 224 from reformate stream 226. As previously discussed, process condensate 224 may be purified and reused, or alternatively discharged from the process. Reformate stream 226 is passed to a gas separator 210 (e.g. a pressure swing adsorber) to produce a hydrogen-containing product gas stream 200 and a by-product gas 250 (e.g., comprising carbon monoxide), the latter of which is recycled to the reformer furnace 100 as a portion of the fuel 35.

Turning now to FIG. 6, in this exemplary embodiment, the reformate 60 is divided into separate streams before being introduced into each of the evaporators. A portion 62 of reformate 60 is passed to evaporator 58. Another portion 68 of reformate 60 is passed to evaporator 52. As previously discussed with regard to FIG. 5, the portion 68 of reformate 60 is cooled in heat transfer coil 59 as a result of heat transfer with a portion 69 of raw water stream 53 brought into contact with the exterior of the coil 59 by spraying the raw water through spray bar 55. However, in this embodiment, the cooled portion 68 of the reformate 60 withdrawn from coil 59 is not passed to evaporator 58; instead, the cooled portion 68 of the reformate 60 is collected and combined with the cooled portion 62 of the reformate 60 from evaporator 58, as discussed below.

The raw water which is sprayed through spray bar 55 onto the exterior of the coil 59 of evaporator 52 produces steam stream 41, which is passed from evaporator 52 into heat transfer coil 57 disposed internally of evaporator 58. A portion 63 of raw water stream 53 is sprayed onto the exterior of heat transfer coil 57 and heat transfer coil 81 through spray bar 102, and the steam stream inside the coil 57 condenses within the heat transfer coil 57, exits evaporator 58 and is collected as water condensate stream 71. Steam stream 43 produced by heat transfer in evaporator 58 by contact with heat transfer coils 57 and 81 is condensed in condenser 134 by contact with heat transfer coil 136, through which cold raw water stream 53 is passed. Purified water condensate from condenser 134 is combined with water condensate stream 71 produced in evaporator 58 and is collected as purified water 42. Low quality reject water 22 collected at the bottom of evaporator 52 is combined with low quality reject water 22 from evaporator 58 as low quality reject water 77, where it can later be utilized in another process or it can be discharged. In addition, like the embodiment of FIG. 5, valves 91 through 93 can be opened and closed such that the low quality reject water 22 is provided to each evaporator in series. More specifically, with valves 91 and 93 open and valve 92 closed, the raw water 53 and low quality reject water 22 will flow as previously discussed, However, with valves 91 and 93 closed and valve 92 open, the low quality reject water 22 from evaporator 58 will be provided to spray bar 55 of evaporator 52 instead of, or in addition to, a portion of raw water 53.

The cooled portion 62 of reformate 60 from heat transfer coil 81 is combined with the cooled portion 68 of reformate 60 from heat transfer coil 59. Again, the reformate 60 returned from the multiple effect distillation process 16 is not passed through heat exchangers (e.g., optional heat exchanger 80 and heat exchanger 90) prior to being passed to knock-out drum 220. Knock-out drum 220 separates process condensate 224 from reformate stream 226. As previously discussed, process condensate 224 may be purified and reused, or alternatively discharged from the process. Reformate stream 226 is passed to gas separator 210 (e.g., a pressure swing adsorber) to produce a hydrogen-containing product gas stream 200 and a by-product gas 250 (e.g., comprising carbon monoxide), the latter of which is recycled to the reformer furnace 100.

Turning now to FIG. 7, shown is an embodiment in which all of the reformate 60 is passed through each of the evaporators 51, 83, 52, and 58, beginning with evaporator 51. Reformate 60 is cooled in heat transfer coil 59 of evaporator 51 as a result of heat transfer with a portion 64 of raw water stream 53 brought into contact with the exterior of the coil 59 by spraying the raw water through spray bar 55. The cooled reformate 60 is withdrawn from coil 59 and passed to a heat transfer coil 82 in another evaporator 83.

The raw water which is sprayed through spray bar 55 onto the exterior of the coil 59 of evaporator 51 undergoes evaporation to form water vapor due to heat transfer between the coil 59 heated by the reformate passing internally therethrough. The steam stream 45 produced by the evaporation passes from evaporator 51 into heat transfer coil 84, which is located inside evaporator 83. A portion 65 of raw water stream 53 is sprayed onto the exterior of heat transfer coil 84 and heat transfer coil 82 through spray bar 103, and the steam stream inside the heat transfer coil 84 condenses within the heat transfer coil 84, exits evaporator 83 and is collected in purified water 42. Steam stream 46 produced by heat transfer in evaporator 83 is passed into evaporator 52 where the process is repeated, and so on for as many evaporators as are present in the system. The steam stream exiting the last evaporator in the series (in FIG. 7, steam stream 43 from evaporator 58) is condensed in condenser 134 by contact with heat transfer coil 136 through which cold raw water stream 53 is passed, as previously discussed. Purified water condensate from condenser 134 is combined with condensate produced in the evaporators and is collected in purified water 42.

The reformate 60 in heat transfer coil 82 is further cooled upon heat transfer with the a portion 65 of raw water stream 53 to produce the steam stream 46. The reformate 60 is then passed to evaporator 52, where the process is repeated, and so on for as many evaporators as are present in the system. The reformate 60 exiting the last evaporator in the series (in FIG. 7, evaporator 58) is returned to knock-out drum 220. Low quality reject water 22 collected at the bottom of evaporator 51 is combined with low quality reject water 22 from evaporators 83, 52, and 58, where it can later be utilized in another process or it can be discharged.

Again, the reformate 60 returned from the multiple effect distillation process 16 is not passed through heat exchangers (e.g., optional heat exchanger 80 and heat exchanger 90) prior to being passed to knock-out drum 220. Knock-out drum 220 separates process condensate 224 from reformate stream 226. Process condensate 224 may be purified and reused, or alternatively discharged from the process. Reformate stream 226 is passed to a gas separator 210 (e.g., a pressure swing adsorber) to produce a hydrogen-containing product gas stream 200 and a by-product gas 250 (e.g., comprising carbon monoxide), the latter of which is recycled to the reformer furnace 100.

Turning now to FIG. 8, in this exemplary embodiment, the reformate 60 is divided into separate streams before being introduced into each of the evaporators. Specifically, in this embodiment, a portion 62 of reformate 60 is passed to evaporator 58; another portion 68 of reformate 60 is passed to evaporator 52; another portion 86 of reformate 60 is passed to evaporator 83; and another portion 87 of reformate 60 is passed to evaporator 51. Alternatively, heat transfer coils that receive portions of reformate 60 could be omitted from one or more evaporators. For example, the heat transfer coils of evaporators 52 and 83 which receive portions 68 and 86 of the reformate 60 could be omitted, which is represented in FIG. 8 by showing these features in dashed lines.

The portion 87 of reformate 60 is cooled in heat transfer coil 59 of evaporator 51 as a result of heat transfer with a portion 64 of raw water stream 53 brought into contact with the exterior of the coil 59 by spraying the raw water through spray bar 55. The cooled portion 87 of reformate 60 is withdrawn from coil 59 but is not passed to evaporator 83; instead, the cooled portion 87 of reformate 60 is combined with cooled portions 62, 68, and 86 of the reformate 60 from evaporators 58, 52, and 83, respectively, as discussed below.

The raw water which is sprayed through spray bar 55 onto the exterior of the coil 59 of evaporator 51 undergoes evaporation to form water vapor due to heat transfer between the coil 59 heated by the reformate passing internally therethrough. The steam stream 45 produced by evaporation passes from evaporator 51 into heat transfer coil 84, which is located inside evaporator 83. A portion 65 of raw water stream 53 is sprayed onto the exterior of heat transfer coil 84 and heat transfer coil 82 through spray bar 103, and the steam stream inside the heat transfer coil 84 condenses within the heat transfer coil 84, exits evaporator 83 and is collected in purified water 42. Steam stream 46 produced by heat transfer in evaporator 83 is passed into evaporator 52 where the process is repeated, and so on for as many evaporators as are present in the system. The steam stream exiting the last evaporator in the series (in FIG. 8, steam stream 43 from evaporator 58) is condensed in condenser 134 by contact with heat transfer coil 136 through which cold raw water stream 53 is passed, as previously discussed. Purified water condensate from condenser 134 is combined the condensate produced in the evaporators and is collected in purified water 42. Low quality reject water 22 collected at the bottom of evaporator 51 is combined with low quality reject water 22 from evaporators 83, 52, and 58 in low quality reject water 77 where it can later be utilized in another process or it can be discharged.

The portion 86 of the reformate 60 in heat transfer coil 82 of evaporator 83 is further cooled upon heat transfer with a portion 65 of raw water stream 53 to produce the steam stream 46, the portion 68 of the reformate 60 in heat transfer coil in the next evaporator (evaporator 52) is further cooled upon heat transfer with a portion 69 of raw water stream 53 to produce steam stream 41, and so on for as many evaporators as are present in the system. The portion of the reformate 60 exiting the last evaporator in the series (in FIG. 8, portion 62 exiting evaporator 58) is combined with the cooled reformate 60 from the other heat transfer coils in the system. Again, the reformate 60 is then returned from the multiple effect distillation process 16 but is not passed through heat exchangers (e.g., optional heat exchanger 80 and heat exchanger 90) prior to being passed to knock-out drum 220. Knock-out drum 220 separates process condensate 224 from reformate stream 226. Process condensate 224 may be purified and reused, or alternatively discharged from the process. Reformate stream 226 is passed to gas separator 210 (e.g., a pressure swing adsorber) to produce a hydrogen-containing product gas stream 200 and a by-product gas 250 (e.g., comprising carbon monoxide), the latter of which is recycled to the reformer furnace 100.

Turning now to FIG. 9, shown is an exemplary embodiment that is a hybrid of the embodiments of FIGS. 7 and 8. In this embodiment, the reformate 60 is divided into separate streams before being introduced into each of two pairs of evaporators. A portion 62 of reformate 60 is passed to evaporator 52, and another portion 87 of reformate 60 is passed to evaporator 51.

The portion 87 of reformate 60 is cooled in heat transfer coil 59 of evaporator 51 as a result of heat transfer with a portion 64 of raw water 53 brought into contact with the exterior of the coil 59 by spraying the raw water through spray bar 55. The cooled portion 87 of reformate 60 is withdrawn from coil 59 and passed to a heat transfer coil 82 in another evaporator 83 (i.e., evaporator 51 and evaporator 83 are a pair).

The raw water which is sprayed through spray bar 55 onto the exterior of the coil 59 of evaporator 51 undergoes evaporation to form water vapor due to heat transfer between the coil 59 heated by the reformate passing internally therethrough. The steam stream 45 produced by the evaporation passes from evaporator 51 into heat transfer coil 84, which is located inside evaporator 83. A portion 65 of raw water 53 is sprayed onto the exterior of heat transfer coil 84 and heat transfer coil 82 through spray bar 103, and the steam stream inside the heat transfer coil 84 condenses within the heat transfer coil 84, exits evaporator 83 and is collected in purified water 42. Steam stream 46 produced by heat transfer in evaporator 83 is passed into evaporator 52 where the process is repeated, and so on for as many evaporators as are present in the system. The steam stream exiting the last evaporator in the series (in FIG. 7, steam stream 43 from evaporator 58) is condensed in condenser 134 by contact with heat transfer coil 136 through which cold raw water 53 is passed, as previously discussed. Purified water condensate from condenser 134 is combined with condensate produced in the evaporators and is collected in purified water 42.

The cooled portion 87 of the reformate 60 in heat transfer coil 82 is further cooled upon heat transfer with the a portion 65 of raw water 53 to produce the steam stream 46, however the cooled portion 87 of the reformate 60 is not then passed to another evaporator; instead, the cooled portion 87 of the reformate 60 is collected and combined with the cooled portion 62 of the reformate 60 from evaporator 58 of the other pair of evaporators, where the process is repeated for as many pairs of evaporators (or larger groups of evaporators) as are present in the system. The cooled portion of the reformate 60 exiting the last evaporator of the series (in FIG. 9, cooled portion 62 exiting evaporator 58 of the pair of evaporators 52 and 58) is combined with cooled portion 87 and cooled portions from any other pairs of evaporators in the system.

Again, the reformate 60 is then returned from the multiple effect distillation process 16 but is not passed through heat exchangers (e.g., optional heat exchanger 80 and heat exchanger 90) prior to being passed to knock-out drum 220. Knock-out drum 220 separates process condensate 224 from reformate stream 226. Process condensate 224 may be purified and reused, or alternatively discharged from the process. Reformate stream 226 is passed to gas separator 210 (e.g., a pressure swing adsorber) to produce a hydrogen-containing product gas stream 200 and a by-product gas 250 (e.g., comprising carbon monoxide), the latter of which is recycled to the reformer furnace 100.

Other embodiments of the multiple effect distillation process 16 include different hybrids of the embodiments discussed in FIGS. 1 through 9. For example, another embodiment involves a hybrid between the embodiments of FIGS. 2 and 7, where the plurality of evaporators (e.g., six evaporators) in the multiple effect distillation process 16 alternate between those that include a single coil for heat transfer with steam from a preceding evaporator (e.g., evaporator 54 in FIG. 2), and those that include both a coil for heat transfer with steam from a preceding evaporator and a coil for heat transfer with reformate (e.g., evaporator 83 in FIG. 7).

Accordingly, in the embodiments of FIGS. 5 through 9, one or more additional evaporators are utilized to cool the reformate 60. Stated differently, one or more additional evaporators have two heat exchange coils: one coil for reformate 60, and another for a steam stream generated in a preceding evaporator. Preferably, all evaporators in the multiple effect distillation process 16 include a heat transfer coil for heat transfer with steam from a preceding evaporator except for an evaporator that is not preceded by another evaporator in a series of evaporators (e.g., evaporator 52 in FIGS. 5 and 6, and evaporator 51 in FIGS. 7 through 9), and at least one evaporator in the series of evaporators includes both a coil for heat transfer with steam from a preceding evaporator and a coil for heat transfer with reformate (e.g., evaporator 58). More preferably, all evaporators in the multiple effect distillation process 16, except for an evaporator that is not preceded by another evaporator in a series of evaporators, include both a coil for heat transfer with steam from a preceding evaporator and a coil for heat transfer with reformate. By utilizing both the heat of the reformate 60 and the heat of the steam stream from each preceding evaporator, the multiple effect distillation process 16 of these embodiments provides greater utilization of the heat from the reformate 60, lessens or eliminates the release of waste heat from the reformer furnace 100, and lessens or eliminates costs associated with equipment and utilities that otherwise may be needed to dissipate waste heat from the reformate 60 to the atmosphere or further cool the reformate 60 prior to being passed to a knock-out drum 220 or gas separator 210.

In addition, the embodiments of FIGS. 5 through 9 provide the flexibility to balance heat load and other operating conditions across the evaporators of the multiple effect distillation process 16 during design and operation. For example, the multiple effect distillation process 16 can be configured with a combination of temperature controllers (not shown) within each evaporator and valves (not shown) on each conduit carrying reformate 60. A control logic can monitor operating temperatures of each evaporator with the temperature controllers and adjust those temperatures by controlling the valves to modify the amount of reformate 60 being passed to each evaporator for heat transfer. By doing so, the control logic may mitigate unwanted temperature gradients across the evaporators of the multiple effect distillation process 16 and also control with greater precision the temperature of the reformate 60 stream ultimately being returned for processing in a gas separator or other piece of equipment having specific temperature requirements. In this respect, the embodiments of FIGS. 6, 8, and 9 afford more control in balancing heat load across the multiple effect distillation process 16 by providing the flexibility to individually regulate how much of the reformate 60 is provided to each evaporator. One disadvantage of such embodiments, however, is that the temperature of the combined portions of the reformate 60 returned from the multiple effect distillation process 16 will be greater than that of embodiments in which all of the reformate 60 is passed through each evaporator in series (e.g., FIGS. 5 and 7).

Example

The following is an example showing the heat utilization of the embodiment of FIG. 2 as compared to the embodiment of FIG. 7. Certain simulation parameters and simulated data have been excluded from the following discussion for clarity.

Example 1 is based on the embodiment shown in FIG. 2. The reformate is withdrawn from the SMR unit upstream of a heat exchanger (e.g., heat exchanger 90) for preheating SMR make-up water with reformate, and optionally, another heat exchanger (e.g., optional heat exchanger 80) for preheating the hydrocarbon feed with reformate. The reformate is fed to a first evaporator of a series of evaporators of the MED unit at 159 C and returns to the SMR unit at 144 C after providing the heat for water evaporation in the first evaporator of the MED unit. The amount of the reformate heat utilized in the MED unit for producing purified water is 47.9 GJ/hr. The return reformate is used in the SMR unit to heat the make-up water. The reformate is then cooled in an air cooler to 37.8 C and fed to a hydrogen PSA unit for separating hydrogen from the reformate and producing the hydrogen product. The heat dissipated from the reformate to atmosphere via the air cooler is 19.5 GJ/hr.

TABLE 1

| | Feed reformate temperature (° C.) | Return reformate temperature (° C.) | Reformate heat load (GJ/hr) | Reformate cooling load in the SMR unit (GJ/hr) |
|---|---|---|---|---|
| Example 1 | 159 | 144 | 47.9 | 19.5 |
| Example 2 | 106 | 38 | 67.5 | 0 |

Example 2 is based on the embodiment shown in FIG. 7. The reformate is withdrawn from the SMR unit after its heat has been fully recovered by the heat sources in the SMR unit (e.g., downstream of heat exchanger 90). The reformate is fed to a first evaporator of a series of evaporators of the MED unit at a lower temperature 106 C. After providing heat for water evaporation in the first evaporator, the reformate is fed to three more evaporators to evaporate water and to be cooled to a desired temperature. The reformate returns to the SMR unit at 37.8 C and is fed to a hydrogen PSA unit for separating hydrogen from the reformate and producing product hydrogen. The reformate heat utilized in the MED unit is 67.5 GJ/hr, which is 19.6 GJ/hr greater than that in Example 1. In addition to better utilizing the heat of the reformate, this integration also does not release any waste heat to atmosphere and does not need any cooling equipment in the SMR unit.

The invention claimed is:

1. A process for producing a $H_2$-containing product gas and for producing purified water from a raw water stream containing contaminants, the process comprising:
  (i) withdrawing a reformate comprising $H_2$, CO, $CH_4$, and $H_2O$ from a reformer furnace;
  (ii) passing at least a portion of the reformate from step (i) to a first evaporator of a plurality of evaporators of a thermal water purification system;
  (iii) passing at least a portion of the raw water stream to the first evaporator;
  (iv) introducing a first steam stream into the first evaporator, the first steam stream formed in a second evaporator of the plurality of evaporators of the thermal water purification system;
  (v) heating the at least a portion of the raw water stream passed to the first evaporator in step (iii) in the first evaporator by indirect heat transfer with the at least a portion of the reformate from step (ii) and separately by indirect heat transfer with the first steam stream from step (iv) to form a second steam stream by evaporating a portion of the at least a portion of the raw water stream, thereby cooling the at least a portion of the reformate, forming a first condensate stream from the first steam stream, and concentrating the contaminants in the at least a portion of the raw water stream;
  (vi) withdrawing the second steam stream from the first evaporator;
  (vii) withdrawing the at least a portion of the reformate from the first evaporator;
  (viii) withdrawing the first condensate stream from the first evaporator, wherein the purified water comprises the first condensate stream;
  (ix) withdrawing the at least a portion of the raw water stream from the first evaporator, the at least a portion of the raw water stream having a higher concentration of the contaminants than when it was introduced into the first evaporator; and
  (x) passing the at least a portion of the reformate withdrawn in step (vii) to a gas separator and separating the at least a portion of the reformate in the gas separator to produce at least a portion of the $H_2$-containing product gas stream and at least a portion of a by-product gas stream.

2. The process of claim 1, wherein the first steam stream is formed by indirect heat exchange with at least one of (a) a second portion or all of the reformate and (b) a steam stream formed in a third evaporator.

3. The process of claim 1, wherein the at least a portion of the reformate is cooled to a temperature ranging from 25° C. to 65° C. in the first evaporator.

4. The process of claim 1, wherein all of the reformate is passed to the first evaporator.

5. The process of claim 1, wherein the reformate or portions thereof heat the raw water stream or portions thereof in each of the plurality of evaporators.

6. The process of claim 1, wherein the raw water comprises at least one of salt water, river water, stream water, lake water, municipal recycled water, industrial recycled water, groundwater, and process condensate from a steam methane reforming process.

7. The process of claim 1, wherein the at least a portion or a second portion of the reformate transfers heat to the at least a portion or a second portion of the raw water stream by indirect heat transfer in the second evaporator.

8. The process of claim 7, wherein the at least a portion of the reformate transfers heat to the second portion of the raw water stream by indirect heat transfer in the second evaporator by:
  passing the at least a portion of the reformate to the second evaporator;
  passing the second portion of the raw water stream to the second evaporator; and
  heating the second portion of the raw water stream in the second evaporator by indirect heat transfer with the at least a portion of the reformate thereby forming the first steam stream by evaporating a portion of the second portion of the raw water stream, thereby cooling the at least a portion of the reformate, and concentrating the contaminants in the second portion of the raw water stream.

9. The process of claim 7, wherein the second portion of the reformate transfers heat to the second portion of the raw water stream by indirect heat transfer in the second evaporator by:
  passing the second portion of the reformate to the second evaporator;
  passing the second portion of the raw water stream to the second evaporator; and
  heating the second portion of the raw water stream in the second evaporator by indirect heat transfer with the second portion of the reformate thereby forming the first steam stream by evaporating a portion of the second portion of the raw water stream, thereby cooling the second portion of the reformate, and concentrating the contaminants in the second portion of the raw water stream.

10. The process of claim 9, further comprising:
withdrawing the first steam stream from the second evaporator;
withdrawing the second portion of the reformate from the second evaporator;
withdrawing the second portion of the raw water stream from the second evaporator, the second portion of the raw water stream having a higher concentration of the contaminants than when it was introduced into the second evaporator; and
passing the second portion of the reformate withdrawn from the second evaporator to the gas separator and separating the second portion of the reformate in the gas separator to produce at least a portion of the $H_2$-containing product gas stream and at least a portion of a by-product gas stream.

11. The process of claim 1, wherein the at least a portion or a third portion of the reformate transfers heat to a third portion of the raw water stream by indirect heat transfer in a third evaporator of the plurality of evaporators.

12. The process of claim 11, wherein the at least a portion of the reformate transfers heat to the third portion of the raw water stream by indirect heat transfer in the third evaporator by:
passing the at least a portion of the reformate to the third evaporator;
passing the third portion of the raw water stream to the third evaporator; and
heating the third portion of the raw water stream in the third evaporator by indirect heat transfer with the at least a portion of the reformate thereby forming a third steam stream by evaporating a portion of the third portion of the raw water stream, thereby cooling the at least a portion of the reformate, and concentrating the contaminants in the third portion of the raw water stream.

13. The process of claim 11, wherein the third portion of the reformate transfers heat to the third portion of the raw water stream by indirect heat transfer in the third evaporator by:
passing the third portion of the reformate to the third evaporator;
passing the third portion of the raw water stream to the third evaporator; and
heating the third portion of the raw water stream in the third evaporator by indirect heat transfer with the third portion of the reformate thereby forming a third steam stream by evaporating a portion of the third portion of the raw water stream, thereby cooling the third portion of the reformate, and concentrating the contaminants in the third portion of the raw water stream.

14. The process of claim 13, further comprising:
withdrawing the third steam stream from the third evaporator;
withdrawing the third portion of the reformate from the third evaporator;
withdrawing the third portion of the raw water stream from the third evaporator, the third portion of the raw water stream having a higher concentration of the contaminants than when it was introduced into the third evaporator; and
passing the third portion of the reformate withdrawn from the third evaporator to the gas separator and separating the third portion of the reformate in the gas separator to produce at least a portion of the $H_2$-containing product gas stream and at least a portion of a by-product gas stream.

* * * * *